(12) United States Patent
Aruga et al.

(10) Patent No.: US 10,995,933 B2
(45) Date of Patent: May 4, 2021

(54) OPTICAL DEVICE AND ILLUMINATION DEVICE

(71) Applicant: NICHIA CORPORATION, Anan (JP)

(72) Inventors: Takanori Aruga, Suwa-gun (JP); Hiroyuki Itahana, Okaya (JP); Wataru Kitahara, Kamiina-gun (JP); Yoshinori Momose, Matsumoto (JP); Masahiro Imai, Chino (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/913,355

(22) Filed: Jun. 26, 2020

(65) Prior Publication Data

US 2020/0408384 A1    Dec. 31, 2020

(30) Foreign Application Priority Data

Jun. 27, 2019 (JP) .............................. JP2019-119942
Jun. 27, 2019 (JP) .............................. JP2019-119943

(51) Int. Cl.
   *F21V 7/00* (2006.01)
   *F21Y 115/10* (2016.01)

(52) U.S. Cl.
   CPC .......... *F21V 7/0091* (2013.01); *F21V 7/0033* (2013.01); *F21Y 2115/10* (2016.08)

(58) Field of Classification Search
   CPC ...... F21V 7/0091; F21V 7/0033; F21V 5/005; F21V 5/008; F21V 5/02; F21V 5/046; F21V 7/0025; F21V 7/0008; F21V 13/04; F21Y 2115/10
   See application file for complete search history.

(56) References Cited

U.S. PATENT DOCUMENTS

| 5,241,462 A | * | 8/1993 | Sugimoto | ............. F21V 7/0016 |
|  |  |  |  | 362/223 |
| 9,169,996 B2 | * | 10/2015 | Van Gorkom | ............. F21V 5/10 |
| 9,857,055 B2 | * | 1/2018 | Hu | .......................... F21V 5/046 |

FOREIGN PATENT DOCUMENTS

| EP | 1072840 | * | 7/2000 | ............... F21S 8/02 |
| JP | 2012-074278 A | | 4/2012 | |
| JP | 2014-102973 A | | 6/2014 | |
| JP | 2014-102995 A | | 6/2014 | |
| JP | 2015-159075 A | | 9/2015 | |

\* cited by examiner

*Primary Examiner* — Peggy A Neils
(74) *Attorney, Agent, or Firm* — Birch, Stewart, Kolasch & Birch, LLP

(57) ABSTRACT

An optical device includes: a first reflective surface disposed to reflect, to a substantially arc-shaped first region around a first axis, at least a portion of first light incident along the first axis and having a light distribution characteristic with an optical axis parallel to the first axis, the first reflective surface including a plurality of reflective arc surfaces separated in a direction along the first axis; a second reflective surface and a third reflective surface intersecting each other on the first axis and disposed such that the first reflective surface is located between the second reflective surface and the third reflective surface; and a light-transmissive emission surface adapted to refract at least a portion of light reflected by the plurality of reflective arc surfaces to emit the light around the first axis, the emission surface having periodic irregularities in a cross section in the direction along the first axis.

21 Claims, 33 Drawing Sheets

OPTICAL DEVICE AND ILLUMINATION DEVICE

CROSS-REFERENCE TO RELATED APPLICATION

This application claims priority to Japanese Patent Applications No. 2019-119942, filed on Jun. 27, 2019, and Japanese Application No. 2019-119943, filed on Jun. 27, 2019, the entire contents of which are hereby incorporated by reference.

BACKGROUND OF THE INVENTION

1. Field of the Invention

The present disclosure relates to an optical device appropriate for illumination of a region having a predetermined shape such as a linear shape or a quadrangular shape and an illumination device employing the optical device.

2. Description of Related Art

Japanese Unexamined Patent Application Publication No. 2012-074278 describes the provision of an illumination device configured to illuminate an irradiation region having an elongated linear shape using a small number of light source modules. The illumination device in Japanese Unexamined Patent Application Publication No. 2012-074278 includes light source units arranged in two rows, each row including four light source units. Each light source unit is composed of a pair of light source modules. The light source module distributes divergent light from a light-emitting element into a first emitted light that is emitted frontward with respect to a substrate through a light source lens and a second emitted light that is refracted through the light source lens, reflected by a second reflection plate, and emitted frontward with respect to the substrate. In the light source unit, the substrates of the two light source modules are arranged back to back at an acute angle, and the light source unit produces a linear illumination light having a uniform width and spreading at an angle between the substrate of one of the two light source modules and the substrate of the other of the two light source modules. Accordingly, the illumination device can irradiate the irradiation region having a long linear shape.

SUMMARY OF THE INVENTION

Light emitted from an LED generally has a Lambertian light distribution, which is a light distribution pattern in which the luminous intensity is highest (largest) on the optical axis. Accordingly, when illuminating an irradiation region of a long linear shape using a small number of or densely arranged illumination devices, the light distribution is required to be controlled by varying angles of a large number of optical axes of a large number of densely arranged LEDs to disperse light along the linear region to be illuminated or by performing different types of complicated processing to light illuminating an end portion of the line and light illuminating a central portion of the line on optical axes that are set obliquely across the linear region. Accordingly, there is a demand for an optical device configured to easily convert a Lambertian light distribution into a distribution of light appropriate for illumination of a region having a predetermined shape such as a linear shape or a quadrangular shape.

An optical device according to one embodiment of the present invention includes: a first reflective surface disposed to reflect, to a substantially arc-shaped first region around a first axis, at least a portion of first light incident along the first axis and having a light distribution characteristic with an optical axis parallel to the first axis, the first reflective surface including a plurality of reflective arc surfaces separated in a direction along the first axis; a second reflective surface and a third reflective surface intersecting each other on the first axis and disposed such that the first reflective surface is located between the second reflective surface and the third reflective surface; and a light-transmissive emission surface adapted to refract at least a portion of light reflected by the plurality of reflective arc surfaces to emit the light around the first axis, the emission surface having periodic irregularities in a cross section in the direction along the first axis.

An illumination device according to another embodiment of the present invention includes the optical device described above and a light source adapted to emit the first light.

In the optical device according to certain embodiments of the present invention, light (first light) incident along the first axis is reflected at the first reflective surface disposed around the first axis to form an arc shape toward a direction perpendicular to the first axis to collimate the reflected light, and the collimated light is refracted by the emission surface and is emitted as illumination light. Accordingly, light with a Lambertian light distribution can be converted into light with a light distribution appropriate for a linear shape region or a quadrangular shape region to be illuminated having a shape such as a linear shape or a quadrangular shape before being emitted.

BRIEF DESCRIPTION OF THE DRAWINGS

FIGS. 21A to 21C schematically show various examples of a relationship between a region to be illuminated and an optical element, in which FIG. 21A shows a schematic cross-sectional view of an optical element appropriate for illumination of a U-shaped region, FIG. 21B shows a schematic cross-sectional view of an optical element appropriate for illumination of a V-shaped region, and FIG. 21C shows a schematic cross-sectional view of an optical element appropriate for illumination of an L-shaped region.

FIG. 30A to FIG. 30C are schematic exploded view of the optical element showing individual parts, in which FIG. 30A is viewed from the emission surface side, FIG. 30B schematically shows the inside of the optical element viewed from obliquely above, FIG. 30C schematically shows the inside of the optical element viewed from obliquely below.

DETAILED DESCRIPTION

Figure 1:
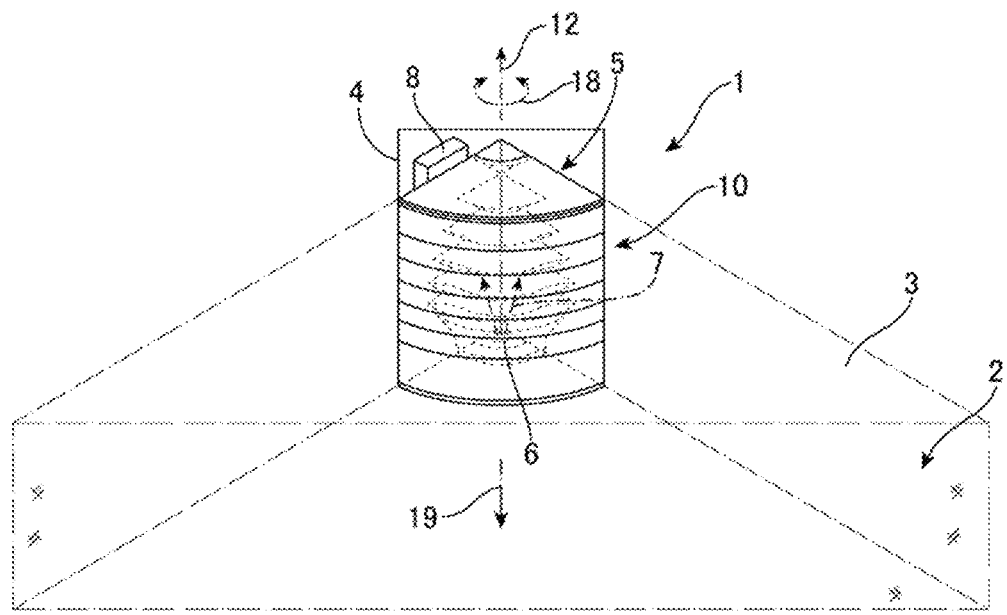
FIG. 1 is a schematic perspective view showing one example of an illumination device.

FIG. 1 shows an illustrative illumination device suitable for illumination of a quadrangular region. This illumination device 1 includes a projection unit 5 that casts or projects, to a front 19, light (pencil of rays) 3 controlled so as to illuminate a quadrangular or linear region 2 such as a top of a desk, a housing 4 having a quadrangular shape in a plan view and accommodating the projection unit 5, and a driver circuit 8 that operates an LED 6 serving as the light source of the projection unit 5. The projection unit 5 includes an optical device (optical system) 10 including a light-transmissive optical element 11 spreading from a peripheral portion 18 surrounding a central axis (i.e., first axis or Z-axis) 12 to form an arc shape and having a substantially fan-shaped columnar shape, a rod-like shape, or a cylindrical lens shape in a plan view (viewed in the X-Y plane orthogonal to the Z-axis 12). The projection unit 5 also includes the LED 6 that emits source light (first light) 7 to allow the source light 7 to be incident on an end surface of the optical element 11.

Figure 2:
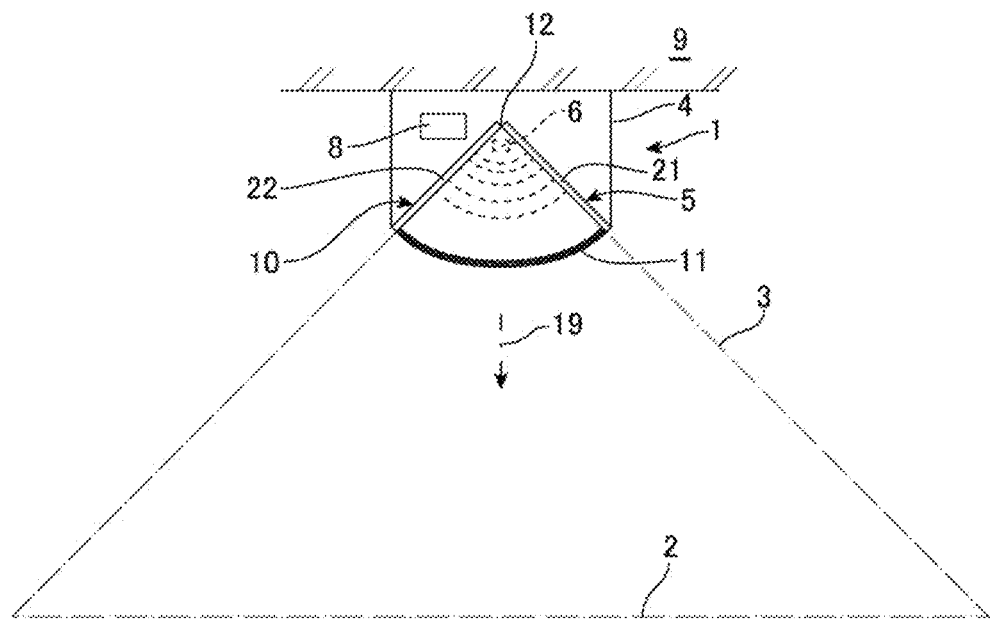
FIG. 2 schematically shows an example in which the illumination device is attached to the ceiling.

The illumination device 1 can be attached to a ceiling 9 to intensively illuminate the quadrangular or linear narrow region 2 such as the top of a desk as shown in FIG. 2. The region to be illuminated is not limited to the top of a desk as long as the region is a quadrangular region or a narrow region and may be a wall, an indoor or outdoor billboard or poster, or the like. The illumination device 1 can intensively illuminate such a quadrangular or narrow region 2. The optical device 10 includes the optical element 11 having a substantially fan shape in a plan view and extending along the first axis 12 serving as the center axis of the fan shape to have a columnar shape, and reflective members 21 and 22 disposed such that the optical element 11 is located between the reflective members 21 and 22.

Figure 3A:
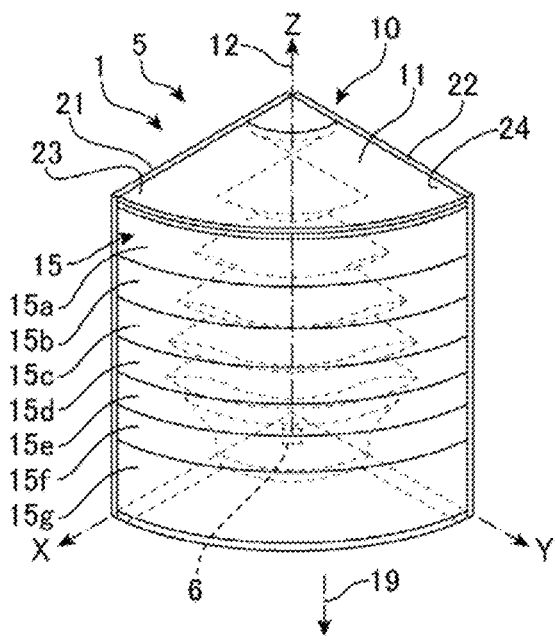
FIG. 3A schematically shows a projection unit when viewed from a front side (when viewed opposite to the direction of radiation).
Figure 3B:
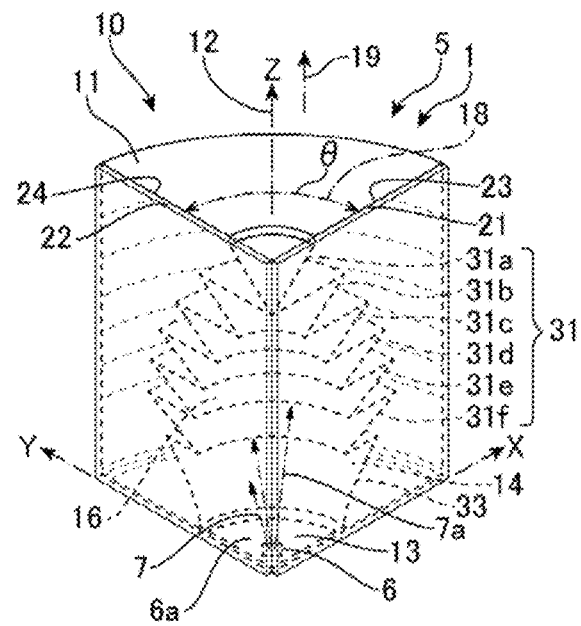
FIG. 3B schematically shows the projection unit when viewed from a side of the Z-axis.
Figure 4:
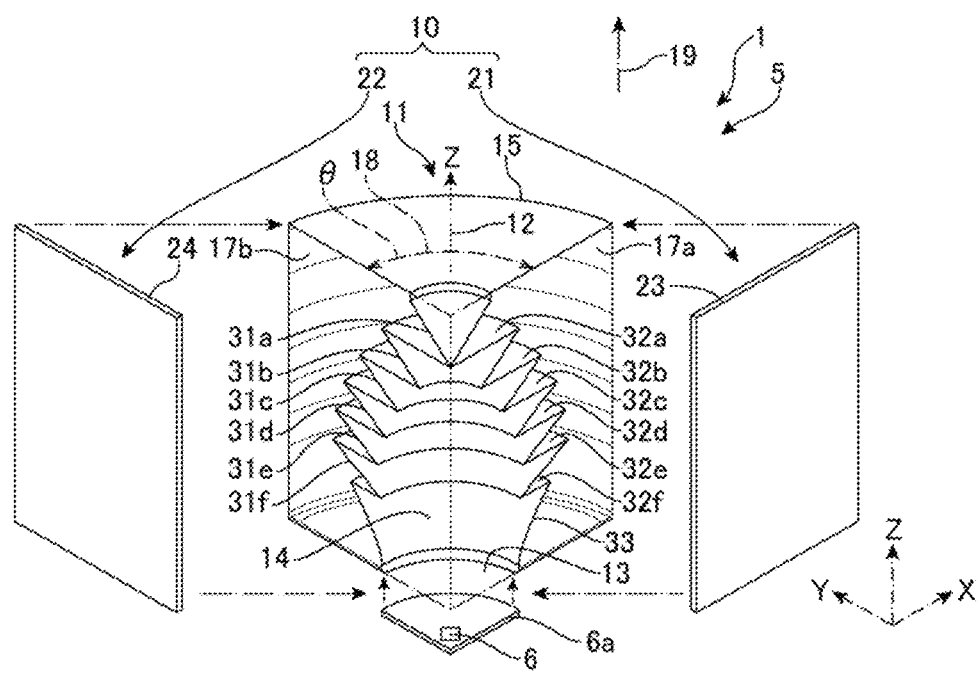
FIG. 4 is a schematic exploded view of the projection unit.

FIGS. 3A and 3B schematically show the projection unit 5 including the optical device 10. FIG. 3A is a schematic perspective view of the projection unit 5 when viewed from the projection side (front side) 19. FIG. 3B is a schematic perspective view of the projection unit 5 when viewed from the side opposite to the projection side 19. FIG. 4 is a schematic exploded view of the projection unit 5 and the optical device 10.

As shown in FIG. 4, the optical device 10 includes the substantially fan-shaped optical element 11 that spreads at an angle θ (central angle θ or opening angle θ) around the first axis (Z-axis) 12, which is the central axis, when viewed (in a plan view) in a plane (X-Y plane) orthogonal to the Z-axis 12 and that is constituted of a light-transmissive member such as an acrylic resin and glass. In the optical element 11 having a columnar shape extending along the Z-axis 12 as a whole, a space 14 having an opening 13 at an end of the Z-axis 12 (on the bottom surface side or in the negative direction of the Z-axis) exists on an Z-axis 12 side (inside), and a surface (emission surface) 15 on a projection side (front and outer side) 19 opposite to Z-axis 12 side has a substantially arc shape. The optical device 10 further includes the reflective members 21 and 22 arranged such that the optical element 11 is disposed between the reflective members 21 and 22. The reflective members 21 and 22 have reflective surfaces 23 and 24 facing the optical element 11. The reflective surface (second reflective surface) 23 and the reflective surface (third reflective surface) 24 are reflective surfaces between which the optical element 11 is disposed, and intersect each other on the Z-axis 12.

Figure 5:
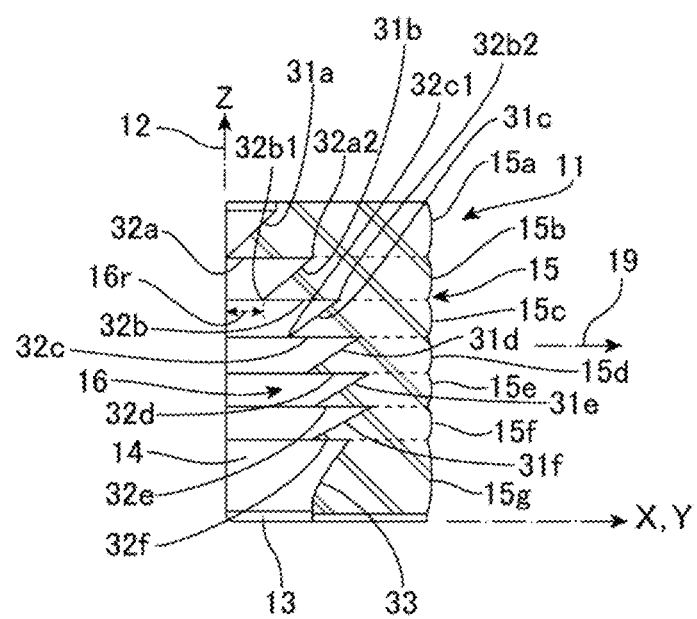
FIG. 5 is a schematic cross-sectional view of a structure of an optical element.

As shown in the schematic cross-sectional view of FIG. 5, the optical element 11 is a cylindrical lens having the space 14 along the Z-axis 12 inside as a whole and having a multilevel inner surface (transmissive/reflective surface) 16 including transmissive surfaces and reflective surfaces alternately arranged along the Z-axis 12 from an opening 13 side of the space 14. The inner surface 16 of the optical element 11 includes a plurality of fan-shaped transmissive surfaces 32 forming coaxial arcs disposed stepwise from a side opposite to the opening 13 toward the opening 13, that is, from the positive side toward the negative side of the Z-axis 12; and a plurality of arc-shaped reflective surfaces (first reflective surface) 31 separated from each other via respective ones of the transmissive surfaces 32 and broadening along the Z-axis 12 at acute angles with the X-Y plane. The inner surface 16 of the optical element 11 includes the fan-shaped transmissive surfaces 32 that are arranged sequentially to form coaxial arcs with inner diameters 16r gradually increasing from the side opposite to the opening 13 toward the opening 13, that is, from the positive side toward the negative side of the Z-axis 12. In another example, transmissive surfaces may be arranged such that the inside diameters 16r gradually decrease from the positive side toward the negative side of the Z-axis 12, or a plurality of fan-shaped transmissive surfaces of the same or substantially the same shapes may be arranged to form coaxial arcs.

More specifically, the first reflective surface 31 of the optical element 11 in the present example includes six reflective surfaces (fourth to ninth reflective surfaces) 31a to 31f separated from each other via respective ones of six transmissive surfaces (first to sixth transmissive surfaces) 32a to 32f perpendicular to the Z-axis 12 and parallel to the X-Y plane from the side (the upper side or the positive direction of the Z-axis) opposite to the opening 13 toward the opening 13, that is, from the positive side toward the negative side of the Z-axis 12. That is, the optical element 11 has the six transmissive surfaces (first to sixth transmissive surfaces) 32a to 32f and the six reflective surfaces (fourth to ninth reflective surfaces) 31a to 31f alternately arranged from the positive side toward the negative side of the Z-axis 12. The optical element 11 further has an arc-shaped transmissive surface 33 that is closest to the opening 13 and formed around the Z-axis 12.

Accordingly, the optical element 11 has the fan-shaped first transmissive surface 32a, second transmissive surface 32b, and third transmissive surface 32c intermittently arranged along the first axis (Z-axis) 12 to have coaxial arc-shape such that the inner diameters 16r gradually increases from the side opposite to the opening 13 toward the opening 13; and the arc-shaped fourth reflective surface 31a, fifth reflective surface 31b, and sixth reflective surface 31c respectively arranged on the side opposite to the opening 13 of the first transmissive surface 32a, the second transmissive surface 32b, and the third transmissive surface 32c so as to be inclined at acute angles.

More specifically, the first transmissive surface 32a farthest from the opening 13 is a fan-shaped transmissive surface centered on the Z-axis 12. The fourth reflective surface 31a farthest from the opening 13 is arranged to reflect light that has passed through the first transmissive surface 32a toward an arc-shaped region (first region) with the angle θ of the peripheral portion 18 surrounding the Z-axis 12. The fourth reflective surface 31a is located on the side opposite to the opening 13 of the first transmissive surface 32a to form a substantially fan-shaped inverted truncated cone centered on the Z-axis 12 inclined relative to the X-Y plane, and reflects light 7 with an optical axis 7a parallel to the Z-axis 12 toward the direction 19 orthogonal to the Z-axis 12. The fifth reflective surface 31b is an arc-shaped reflective surface arranged between an inner edge 32b1 of the second transmissive surface 32b and an outer edge 32a2 of the first transmissive surface 32a so as to reflect the light 7 that has passed through the second transmissive surface 32b. The sixth reflective surface 31c is an arc-shaped reflective surface located between an inner edge 32c1 of the third transmissive surface 32c and an outer edge 32b2 of the second transmissive surface 32b so as to reflect the light 7 that has passed through the third transmissive surface 32c. The seventh reflective surface 31d and the eighth reflective surface 31e have substantially the same constitutions with respect to the fourth transmissive surface 32d and the fifth transmissive surface 32e.

While the outer surface 15 of the optical element 11 may be a cylindrical surface, the outer surface 15 in the present example is partitioned into seven regions 15a to 15g corresponding to the reflective surfaces 31a to 31f and the transmissive surface 33 along the Z-axis 12. The regions 15a to 15g of the outer surface 15 are optimized as toric free-form surfaces such that light reflected by the reflective surfaces 31a to 31f and light transmitted through the transmissive surface 33 are more uniformly emitted.

In the optical device (optical system) 10, the second reflective surface 23 and the third reflective surface 24 of the reflective members 21 and 22 are attached in contact with lateral surfaces 17a and 17b of the optical element 11, which is a cylindrical lens having a substantially fan shape in a plan view.

As shown in FIG. 3A to FIG. 4, the projection unit 5 of the illumination device 1 includes the optical device 10 and a substrate 6a attached to the opening 13 of the optical element 11. The LED 6 is mounted on the substrate 6a, and an illuminating light 7 travels from the LED 6 in the opening 13 toward the first reflective surface 31 of the space 14 of the optical element 11 along and parallel to the Z-axis 12. The first reflective surface 31 constituted by the separate reflective surfaces 31a to 31f are arranged so as to reflect, to the first region with the central angle θ of the peripheral portion 18 surrounding the Z-axis 12, the illuminating light (first light) 7 having a light distribution characteristic with the optical axis 7a parallel to the Z-axis 12. The optical device 10 includes the first reflective surface 31 and the second and third reflective surfaces 23 and 24, the second and third reflective surfaces 23 and 24 intersecting each other on the Z-axis 12 such that the first reflective surface 31 is disposed between the second and third reflective surfaces 23 and 24. The second reflective surface 23 reflects the first light 7 at the peripheral portion 18 surrounding the Z-axis 12 in the direction of the first reflective surface 31. The third reflective surface 24 reflects the light 7 from the LED 6 at the peripheral portion 18 surrounding the Z-axis 12 in a direction opposite to the direction of reflection by the second reflective surface 23.

Accordingly, in the optical device 10, the second reflective surface 23 and the third reflective surface 24 intersecting each other on the Z-axis 12 at the central angle θ reciprocally reflect, in the direction of the arrangement of the first reflective surface 31 in the region with the angle θ, the light 7 emitted from the LED 6 serving as the light source along the Z-axis 12. The optical device 10 emits light to the region with the angle θ around the Z-axis 12 in a direction perpendicular to the Z-axis 12 by reflection by the first reflective surface 31.

The second reflective surface 23 and the third reflective surface 24 are disposed to reflect the light 7 from the LED 6 to the region with the angle θ and to be disposed at least near the LED 6. The reflective surfaces 23 and 24 may intersect the first reflective surface 31, which allows for efficiently reflecting the light 7 from the LED 6 in the direction of the arrangement of the first reflective surface 31 without leakage.

Figure 6A:
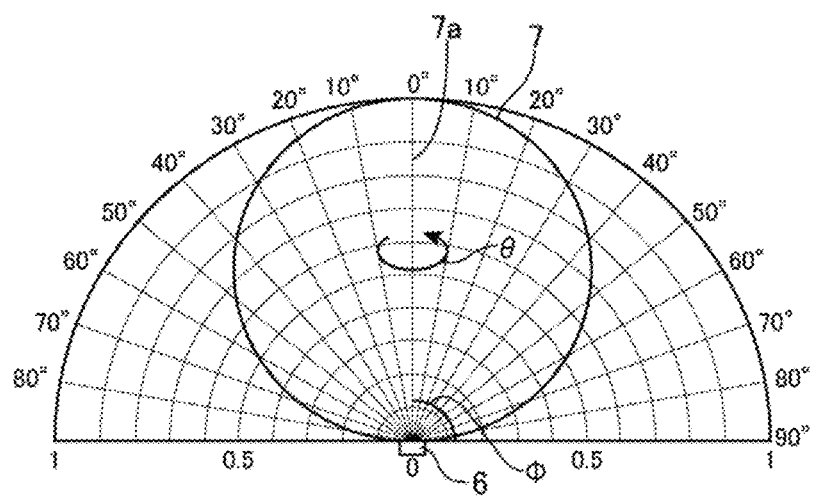
FIG. 6A schematically shows the distribution of incident light.
Figure 6B:
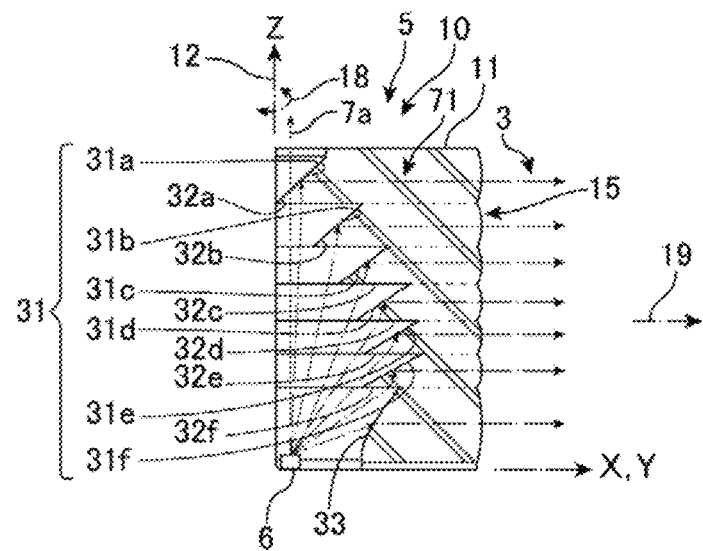
FIG. 6B schematically shows reflection of the incident light by reflective surfaces 31 of an optical element 11.

FIGS. 6A and 6B schematically show a situation in which the light (incident light) 7 incident on the optical element 11 of the optical device 10 along the Z-axis 12 is reflected by the first reflective surface 31 and emitted in the direction 19 orthogonal to the Z-axis 12. As shown in FIG. 6A, the light 7 emitted from the LED (light source) 6 has a Lambertian light distribution centered on the optical axis 7a. A component of the light 7 around the optical axis 7a is reflected by the second reflective surface 23 and the third reflective surface 24 in the direction of the fan-shaped optical element 11 with the central angle θ. As shown in FIG. 6B, a component of the light 7 in an angle φ of light distribution with respect to the optical axis 7a is divided by the transmissive surfaces 32a to 32f and the separate reflective surfaces 31a to 31f of the optical element 11 into a plurality of groups (pencils of rays), and pencils of rays 71 respectively reflected are emitted in the direction 19 orthogonal to the optical axis 7a. The reflected rays 71 are emitted as the illumination light 3 through the emission surface 15, which is the outer surface of the optical element 11. A component of the light 7 emitted from the LED 6 at a large angle φ of light distribution is emitted in the direction 19 orthogonal to the optical axis 7a through the transmissive surface 33 near the opening 13 of the optical element 11.

Accordingly, the optical device 10 can convert the light 7 with the Lambertian light distribution into the illumination light 3 with a light distribution appropriate for illumination of a linear or quadrangular region by allowing the first reflective surface 31, the second reflective surface 23, and the third reflective surface 24 to reflect the light 7 in the direction 19 orthogonal to the optical axis 7a so as to form an arc shape. Further, the first reflective surface 31 can convert the light 7 into light traveling in a direction orthogonal to the optical axis 7a by reflecting the light 7 in the direction 19 orthogonal to the optical axis 7a to extend a portion sharing a common luminous intensity in the Lambertian light distribution, in which the luminous intensity varies according to the angle φ of light distribution around the optical axis 7a, from one end to the other end of a linear or quadrangular light distribution. For example, the light (pencil of rays) on the optical axis 7a with the highest luminous intensity can be extended from one end to the other end of a linear or quadrangular light distribution. Accordingly, a linear or quadrangular light distribution with a more uniform luminous intensity distribution can be obtained by controlling the curvature or inclination of the first reflective surface to control the luminous intensity in the width direction of the linear or quadrangular shape.

Figure 7A:
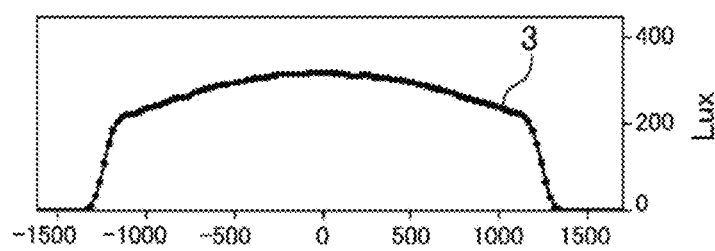
FIG. 7A and FIG. 7B schematically show examples of the distribution of emitted light.
Figure 7B:
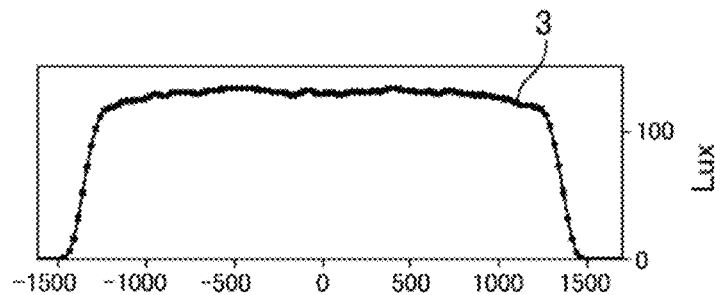

FIGS. 7A and 7B schematically show examples of the light distribution of the light 3 emitted from the projection unit 5 in the horizontal direction (lateral direction). FIG. 7A schematically shows an example of the light distribution in the case in which the outer surface 15 of the optical element 11 in a cross section orthogonal to the first axis forms an arc of a circle. FIG. 7B schematically shows an example of the light distribution in the case in which the outer surface 15 in a cross section orthogonal to the first axis is a free-form surface. Use of the optical device 10 enables the light 7 with the Lambertian light distribution emitted from the LED 6 to be converted into the light 3 with a luminous intensity distribution substantially uniform in the horizontal direction and to be emitted. Optimizing the outer surface 15 using a free-form surface, an aspheric surface, or the like allows for obtaining uniform distribution of the light 3 emitted from the optical device 10.

Figure 8:
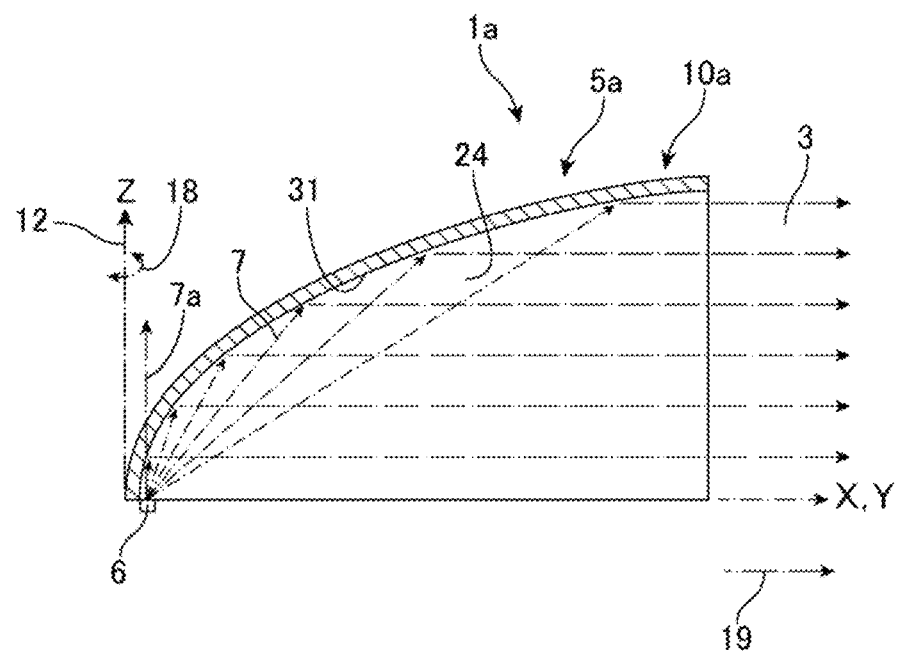
FIG. 8 is a schematic cross-sectional view of another example of the illumination device.

FIG. 8 is a schematic cross-sectional view of another example of the illumination device in which at least a portion of the first light that has a light distribution characteristic with the optical axis parallel to the first axis and is incident along the first axis is reflected to the substantially arc-shaped first region around the first axis. A projection unit 5a of the illumination device 1a includes an optical device 10a that has a continuous first reflective surface 31 having a substantially fan shape in a plan view and the second reflective surface (not shown) and the third reflective surface 24, with the first reflective surface 31 disposed between the second reflective surface and the third reflective surface 24. Also in the projection unit 5a, the optical device 10a can convert the light 7 emitted from the LED 6 in the direction of the Z-axis 12 into light in the direction 19 orthogonal to the Z-axis 12, and the light converted into the light 3 with a luminous intensity substantially uniform in the horizontal direction can be emitted.

On the other hand, in the optical device 10a of the projection unit 5a, employing the continuous first reflective surface 31 increases the region occupied by the first reflective surface 31, which leads to increase in size of the device. On the contrary, in the optical device 10 including the cylindrical optical element 11, the first reflective surface 31 is provided as a plurality of total-reflection surfaces 31a to 31f separate from one another inside the cylindrical lens, like a Fresnel lens. That is, the optical device 10 has the reflective surfaces 31a to 31f that are separated from one another in the direction along the Z-axis (first axis) 12 and reflect the light (first light) 7 from the LED 6 to the direction 19 orthogonal to the Z-axis 12 at the peripheral portion 18 surrounding the Z-axis 12. Further, the optical device 10 includes the optical element 11 that has a fan shape in a cross section perpendicular to the Z-axis (first axis) 12, has the reflective surfaces 31a to 31f inside, and has the multilevel inner surface 16 including the reflective surfaces 31a to 31f and the transmissive surfaces 32a to 32f respectively corresponding to the reflective surfaces 31a to 31f.

Accordingly, the compact optical device 10 and the compact illumination device 1 employing the same can be provided. Further, the optical element 11 has the reflective surfaces 31a to 31f and the corresponding regions (emission surfaces) 15a to 15f of the outer surface 15. With this structure, the reflective surfaces and the emission surfaces can be optimized for light reflected or transmitted by these surfaces, which allows for obtaining the optical device 10 that converts light into the light 3 with an even more uniform luminous intensity distribution in the horizontal direction and emits the light.

Each of the emission surfaces 15a to 15f corresponding to the reflective surfaces 31a to 31f of the optical element 11 is generally a toric surface including a portion curved in a cross section in the direction along the Z-axis 12. Further, the emission surfaces 15a to 15f can have any appropriate design and each of the emission surfaces 15a to 15f may include a portion that is noncircular in a cross section perpendicular to the Z-axis 12.

As described above, the optical element 11 of the optical device 10 has at least one first reflective surface 31 inside that reflects, to the substantially arc-shaped first region with the angle θ around the first axis 12, at least a portion of the first light 7 having a light distribution characteristic with the optical axis 7a parallel to the first axis 12 incident along the first axis (Z-axis) 12. More specifically, the optical element 11 has the reflective surfaces (reflective arc surfaces) 31a to 31f that function as the first reflective surface 31 and are separated in the direction along the first axis 12 and the light-transmissive outer surface (emission surface) 15 that refracts at least a portion of the rays 71 reflected by the reflective arc surfaces 31a to 31f and emits the light as the illumination light 3 around the first axis 12. Accordingly, the optical element 11 has the first reflective surface 31 that converts the direction of travel (optical axis) of the first light 7 with the optical axis 7a parallel to the first axis 12 into a direction different from the first axis 12, that is, a direction orthogonal to the first axis 12 in the above example, and the emission surface 15 functioning as a refracting surface (lens) that converts the optical axis and/or the light distribution as the illumination light 3 by refracting and emitting the reflected rays 71. Thus, compared with the optical device 1a that controls the distribution of the illumination light 3 using only the reflective surface 31 as shown in FIG. 8, the optical device 10 includes two factors controlling the direction of emission and/or the light distribution of the illumination light 3, which facilitates control of the divergence and distribution of the illumination light 3, and the illumination light 3 having a more uniform light distribution is easily emitted.

In the optical element 11 described above, a plurality of total internal reflection (TIR) prisms respectively having the arc surfaces 31a to 31f constituting the first reflective surface 31 and the transmissive surfaces 32a to 32f in combination are arranged for the inner surface 16, and the outer surface 15 includes the emission surfaces 15a to 15f corresponding to the arc surfaces 31a to 31f, so that the first reflective surface 31 and the outer surface 15 functioning as a refracting surface are integrated. It is also easy to constitute toric surfaces by dividing the outer surface 15 into the emission surfaces 15a to 15f corresponding to the arc surfaces 31a to 31f serving as TIR lens surfaces and to introduce a surface for controlling the light distribution around the Z-axis 12, and the illumination light 3 having a more uniform light distribution can be emitted.

The optical device 10 includes the optical element 11 that controls the direction and divergence of the illumination light 3 constituted of the first light 7, and the second reflective surface 23 and the third reflective surface 24 intersecting each other on the first axis (Z-axis) 12 with the optical element 11 having the first reflective surface 31 disposed between the second reflective surface 23 and the third reflective surface 24. With this structure, the first light 7 having a divergence of 360° (directions of the whole circumference) can be condensed (reflected) onto a region in which the first light 7 can be processed by the first reflective surface 31 of the optical element 11, so that the light 7 emitted from the LED 6, which is the light source, can be efficiently emitted as the illumination light 3 in a desired direction and region.

Figure 9A:
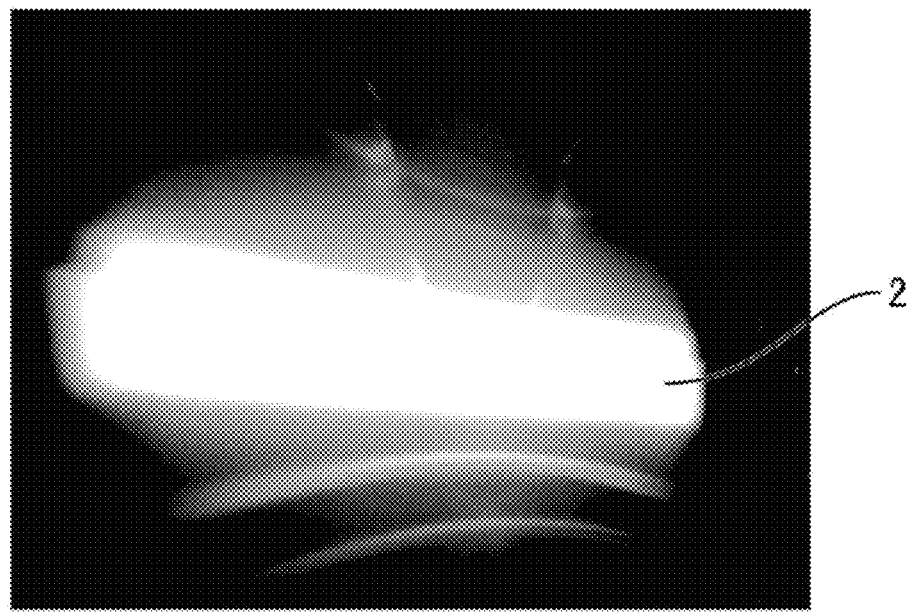
FIG. 9A and FIG. 9B schematically show an example of illumination obtained by the illumination device.
Figure 9B:
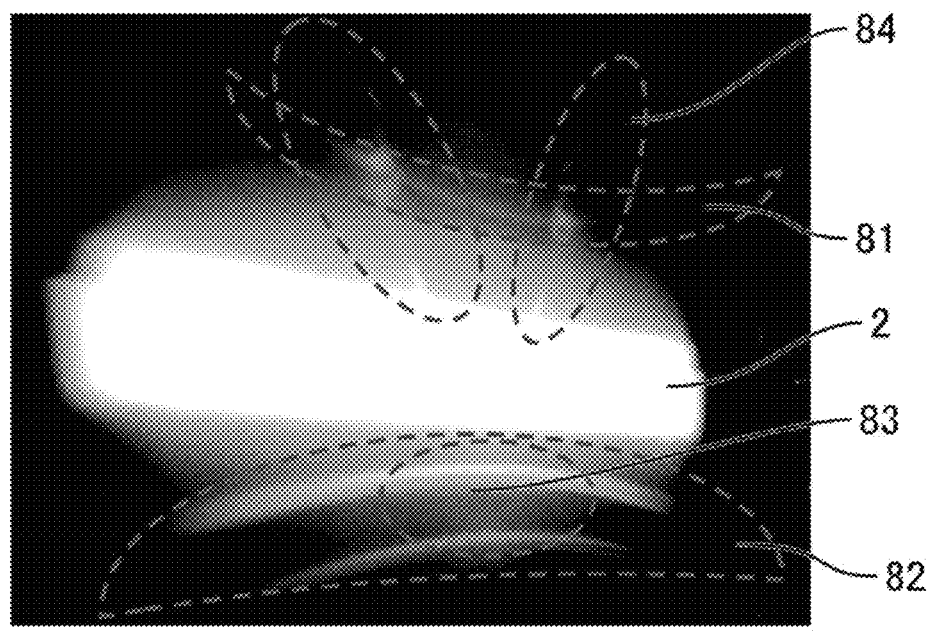

FIG. 9A schematically shows an example of the light 3 emitted from the illumination device 1 including the projection unit 5 and projected on a screen. As shown in FIG. 9B, a plurality of light leakages 81 to 84 were found above and below the quadrangular illuminated region 2. According to experiments by the present inventors, it has been found that the arc-shaped light leakages 81 to 83 are attributable to stray light produced by surface reflection by the transmissive surface 33 and the emission surface 15g on the lowermost layer of the optical element 11. The optical element 11 has the surface that transmits a portion of the light 7 in the direction 19 orthogonal to the Z-axis 12 in the lowermost portion closest to the incident side of the multilevel inner surface 16 so as to allow emission, in the direction 19 orthogonal to the Z-axis 12, of a component at the largest angle φ of light distribution of the light 7 with the Lambertian light distribution. Accordingly, the arc-shaped light leakages 81 to 83 can be reduced by anti-reflection-coating or diffusing, such as graining, at least one of the inner surface 33 and the outer surface (emission surface) 15g in the lowermost portion of the light-transmissive optical element 11.

According to experiments by the present inventors, it has been found that the horn-like shape light leakages 84 are attributable to the inner surface reflection by the lateral surfaces 17a and 17b of the optical element 11. Accordingly, with anti-transmission processing or diffusing processing on the lateral surfaces 17a and 17b on both sides of the optical element 11 in a direction around the Z-axis 12, the light leakages 84 can be reduced. More specifically, coloring the lateral surfaces 17a and 17b black or providing irregularities on the lateral surfaces 17a and 17b allows for reducing the light leakages 84.

Figure 10:
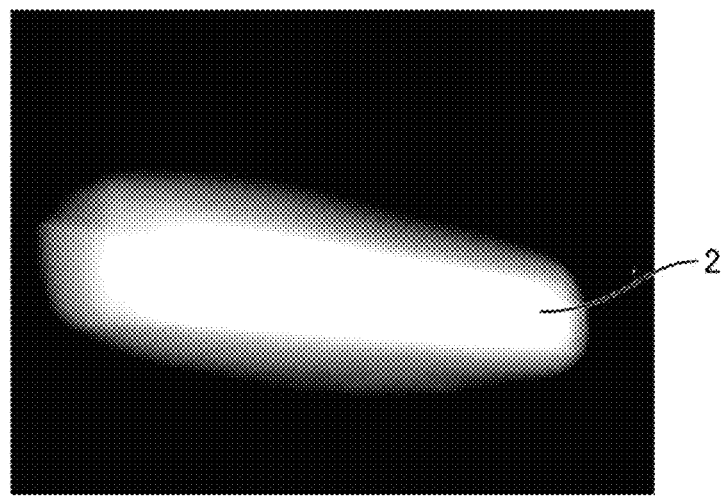
FIG. 10 schematically shows another example of illumination obtained by the illumination device.

FIG. 10 schematically shows an example of the light 3 emitted from the illumination device 1 including the optical element 11 with the configuration described above and cast on a screen. Light leakages were hardly observed, and it has been found that light leakages are reduced by the configuration as described above.

Figure 11A:
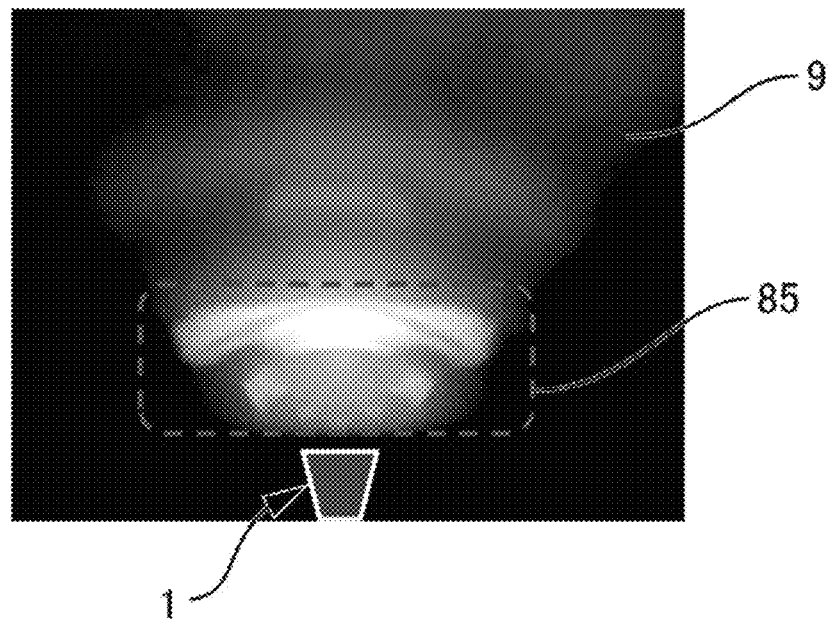
FIG. 11A and FIG. 11B schematically show another example of light leakage caused when using the illumination device.

FIG. 11A schematically shows illustrative stray light 85 that may appear around the illumination device 1, for example, on the ceiling 9. It is thought that the stray light 85 is attributable to light reflected by the reflective surfaces 31 and the transmissive surfaces 32 in the inner surface 16 of the optical element 11.

Figure 11B:
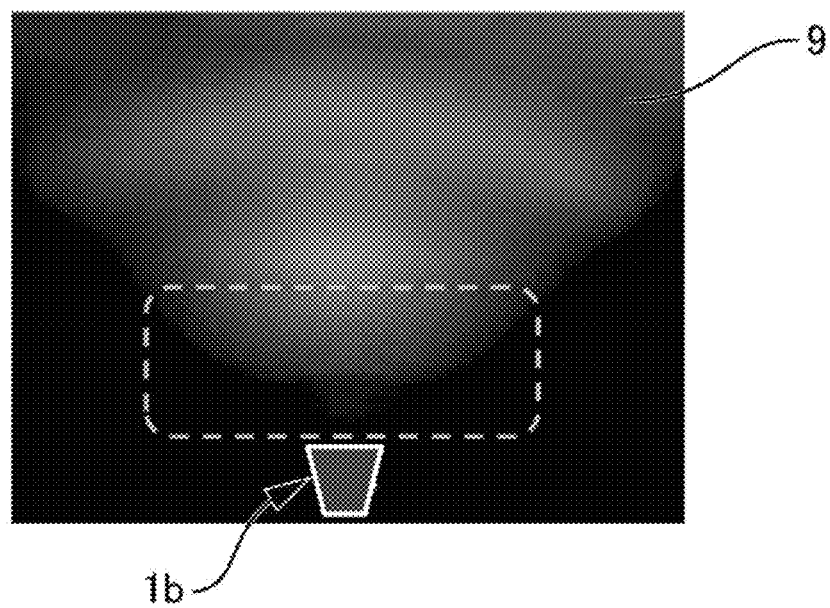
Figure 12:
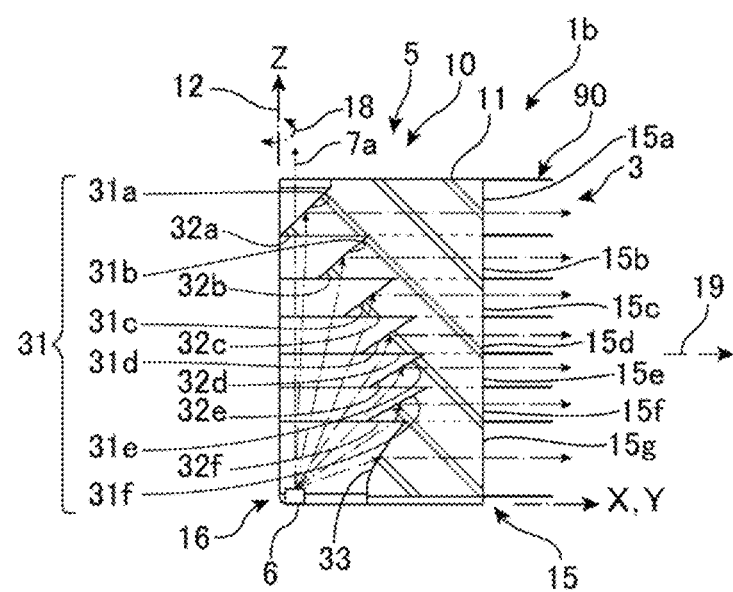
FIG. 12 is a schematic cross-sectional view of still another example of the illumination device.

FIG. 12 schematically shows still another example of the illumination device 1b. The illumination device 1b includes a plurality of louvers (shielding plates) 90 on the boundaries between the layers (regions) 15a to 15g in a front side 19 of the outer surface (emission surface) 15 of the optical element 11 of the illumination device 1 described above. The louvers 90 are plate-like members extending parallel to the direction of emission, that is, parallel to the X-Y plane, toward the front side 19 from the outer surface 15 of the optical element 11. As shown in FIG. 11B, the stray light 85 was hardly observed in the case of the illumination device 1b provided with the louvers 90.

The louvers 90 can further collimate the illumination light 3 emitted from the outer surface 15 of the optical element 11 and reduce the effect of divergent rays produced by stray light inside the optical element 11. A plurality of louvers 90 are distributed in the Z-axis direction such that each of the louvers 90 corresponds to a respective one of the layers 15a to 15g in the illumination device 1b, but each of the louvers 90 may be disposed for corresponding two or more of the layers 15a to 15g or disposed at predetermined intervals in the Z-axis direction regardless of the layers 15a to 15g. The intervals between the louvers 90 and the amounts (lengths) of projection of the louvers 90 from the outer surface 15 of the optical element 11 can be determined by the degree of parallelism of the illumination light 3 required to illuminate the illuminated region 2, the intensity and divergence (angle) of the divergent rays, which constitutes stray light, from the outer surface 15 of the optical element 11, and the like. For example, the length of a louver 90 is approximately equal to the radius (distance from the optical axis to the outer surface) of the optical element 11. In the case in which the intervals between the louvers 90 are excessively short, luminance unevenness is likely to be caused in the illuminated region. In the case in which the intervals between the louvers 90 are excessively long, such as the case in which the louvers 90 are installed only at the top and the bottom, it is difficult to inhibit the effect of stray light. Accordingly, in a preferable example, the louvers 90 are disposed at the intervals of the layers 15a to 15g.

As described above, the illumination device 1 includes the lens (which may be referred to as a refractor, a transmissive member, or the optical element) 11 having the shape of a body of revolution, the optical element 11 has the shape of a fan-shaped cylindrical column defining a recess (i.e., a partial cylindrical column or body of revolution defining an angular recess). The space 14, surrounded by surfaces parallel to the lateral surfaces 17a and 17b of the optical element 11 and the incident surface (opening) 13 of the optical element 11, is defined by the reflective surfaces 23 and 24 as the surfaces parallel to the lateral surfaces 17a and 17b. The LED 6 serving as the light source is disposed inward of the intersection (Z-axis) 12 of the reflective surfaces 23 and 24. The LED 6 serving as the light source is therefore disposed offset from the rotation axis (central axis or Z-axis) 12 inside the optical element 11 having the shape of a cylindrical column. However, the light 7 from the LED 6 is subjected to reflection by the reflective surfaces 23 and 24, and the light 3 is emitted from the optical element 11 as if the light source is located on the Z-axis 12.

The optical element 11 has the arc-shaped emission surfaces 15a to 15g. The optical element 11 also has the transmissive portion (curved inner wall) 33 on the bottom surface side (opening 13 side) of the inside (inner surface) 16 and the total internal reflection surfaces 31a to 31f on the upper surface side (optical axis direction or the side opposite to the opening 13). The total internal reflection surfaces 31a to 31f are inclined inner walls that causes total internal reflection and emit the illumination light 3 matched in the same direction perpendicular to the Z-axis 12 and the optical axis 7a at the peripheral portion 18 surrounding the Z-axis 12. The arc-shaped emission surfaces 15a to 15g of the optical element 11 include curved surfaces having the function of lenses. Accordingly, in a cross section of the optical element 11 in the direction along the optical axis direction 7a, the total internal reflection surfaces 31a to 31f of the reflective portions have straight lines or curved surfaces, and the emission surfaces 15a to 15g also have straight lines or curved surfaces.

With this structure, the optical device 10 efficiently and more uniformly converts the light 7 from the light source (LED) 6 into light with a linear or quadrangular light distribution. Accordingly, the illumination device 1 that can more uniformly and brightly illuminate a linear or quadrangular region can be provided using the optical device 10.

Figure 13A:
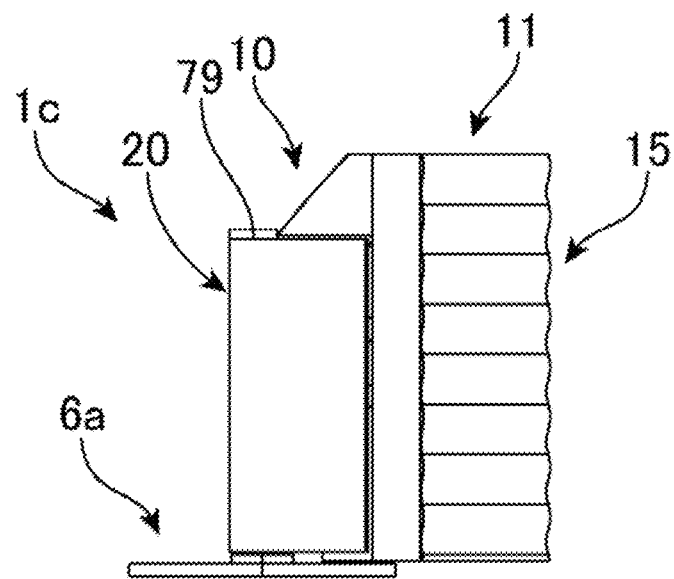
FIG. 13A and FIG. 13B are a schematic lateral view and a schematic plan view, respectively, of yet another example of the illumination device.
Figure 13B:
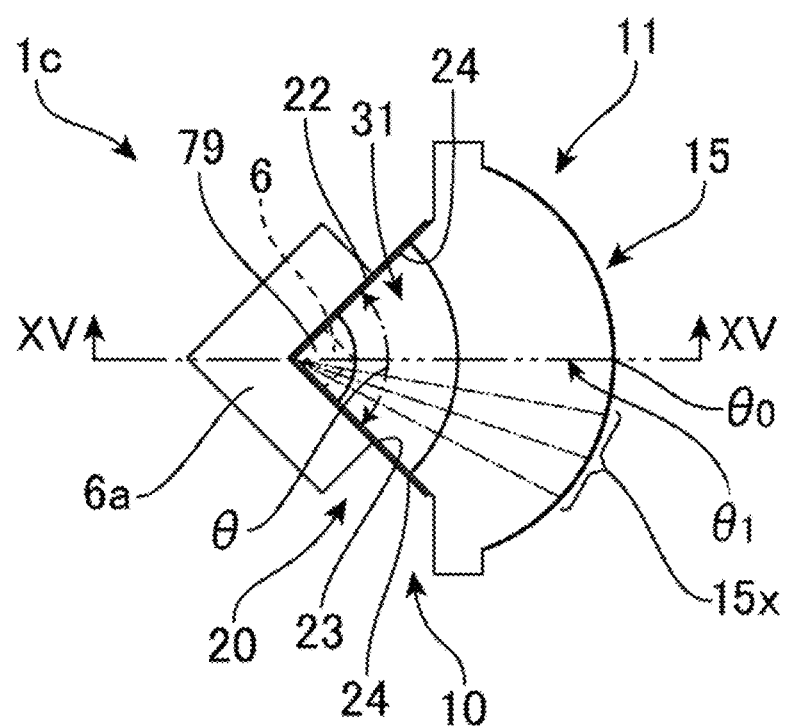
Figure 14:
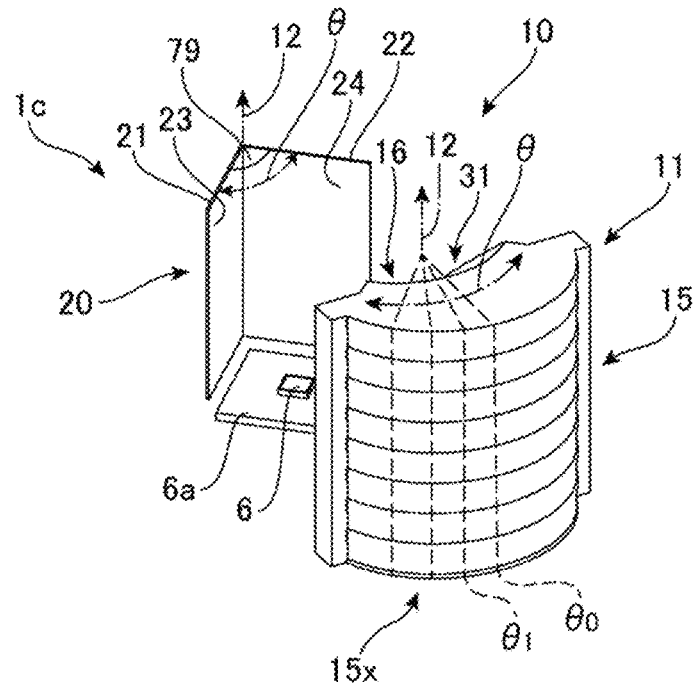
FIG. 14 is a schematic exploded view of the illumination device in FIGS. 13A and 13B showing individual elements.
Figure 15:
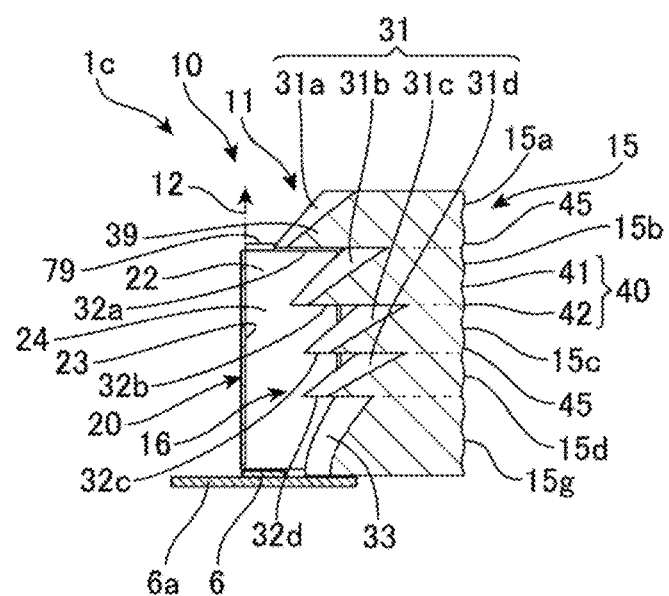
FIG. 15 is a schematic cross-sectional view of the illumination device shown in FIGS. 13A and 13B.
Figure 16:
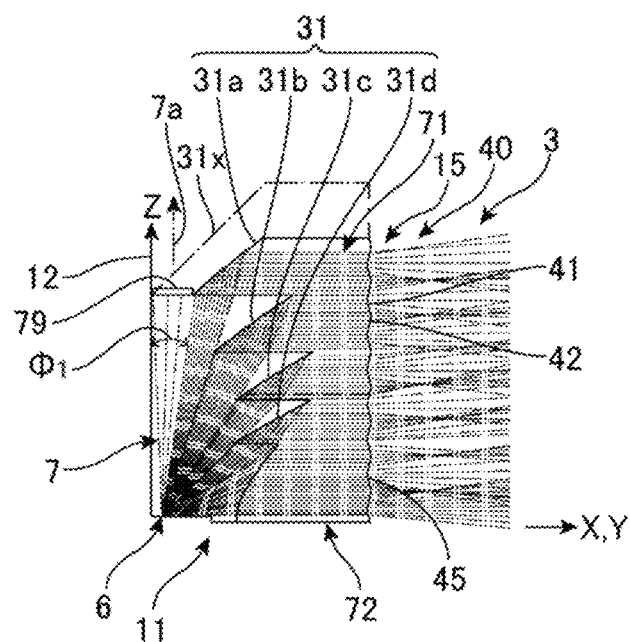
FIG. 16 schematically shows processing of light in the illumination device.

FIG. 13A is a schematic lateral view of yet another illumination device 1c. FIG. 13B is a schematic top view of the illumination device 1c. FIG. 14 schematically shows an exploded view of the illumination device 1c. FIG. 15 is a schematic cross-sectional view of the schematic structure of the illumination device 1c taken along the line XV-XV (see FIG. 13B) along the center of the illumination device 1c. Further, FIG. 16 schematically shows emission of the illumination light 3 from the illumination device 1c. The illumination device 1c includes the optical device 10 configured to convert the light (first light) 7 from the LED 6 serving as the light source into the illumination light 3 and emits the light, and the substrate 6a on which the LED 6 that emits the first light 7 has been mounted. The optical device 10 has the first reflective surface 31 configured to reflect, to the substantially arc-shaped first region with the angle θ around the first axis 12, at least a portion of the first light 7 incident along the first axis (Z-axis) 12 and having a light distribution characteristic with the optical axis 7a parallel to the first axis 12, the second reflective surface 23 and the third reflective surface 24 that intersect each other on the first axis 12 with the first reflective surface 31 located between the second reflective surface 23 and the third reflective surface 24, and the light-transmissive emission surface 15 adapted to refract at least a portion of the rays 71 reflected by the first reflective surface 31 to emit the rays around the first axis 12.

More specifically, the optical device 10 includes a bent mirror 20 in which the first reflective member 21, having the second reflective surface 23, and the second reflective member 22, having the third reflective surface 24, intersect each other on the first axis 12 at the angle θ, and the light-transmissive optical element 11 having the inner surface 16 including the first reflective surface 31 and the emission surface 15 that serves as the outer surface. The first reflective surface 31 includes the reflective arc surfaces 31a to 31d separated in the direction along the first axis 12, and the light-transmissive emission surfaces 15 that refract at least a portion of the rays 71 reflected by the reflective arc surfaces 31a to 31d and emit the light around the first axis 12 have periodic irregularities 40 in a cross section in the direction along the first axis 12. The optical element 11 further has the transmissive surface 33 that transmits the first light 7 on the incident side (lowermost portion) of the first light 7 in the inner surface 16. The transmissive surface 33 refracts and guides a wide-angle (peripheral) component of the first light 7 to the emission surface 15. The emission surface 15 also includes a portion (region) that emits light (light in a direction substantially orthogonal to the first axis 12 in the present example) 72 the direction of which has been changed by refraction with respect to the first axis 12 as the illumination light 3, and the periodic irregularities 40 are formed throughout the entire emission surface 15 in the direction along the Z-axis 12.

The periodic irregularities 40 in the direction along the first axis (Z-axis) 12 include recesses 41 and protrusions 42 repeated at a predetermined pitch in the Z-axis direction. The irregularities 40 may form the shape of a sine wave, a zigzag in which a straight line is bent many times into the Z shape, or a combination of straight lines and curved lines. The recesses 41 and the protrusions 42 alternately and repeatedly appear. The amplitude, which is the distance (width) between a peak and a valley of the irregularities 40, and the pitch (period) of repetition of the periodic irregularities 40 may be constant in the direction of the Z-axis 12 or may vary in the direction of the Z-axis 12 according to a predetermined function. The amplitude and the period of the periodic irregularities 40 may be constant in the direction (circumferential direction, i.e., θ direction) around the Z-axis 12 or may vary in the θ direction according to a predetermined function. The emission surface 15 may have periodic irregularities in the circumferential direction.

The light-transmissive emission surface 15 may have a plurality of inflection points 45 at predetermined intervals in a cross section in the direction along the first axis 12. Each of the inflection points 45 may be at least one of a location at which the surface changes from a protrusion 42 to a recess 41 or from a recess 41 to a protrusion 42, a location at which the surface changes from a curved line to a straight line or from a straight line to a curved line, and a location at which the inclination direction of a straight line changes.

The emission surface 15 having the periodic irregularities 40 and/or the inflection points 45 at predetermined intervals has an effect on the emitted illumination light 3 to obtain more uniform intensity distribution (luminous intensity distribution) of the illumination light 3 in the vertical direction. The period of the periodic irregularities 40 or the intervals between the inflection points 45 may or may not correspond to the reflective surfaces 31*a* to 31*d* and the transmissive surface 33 of the optical element 11. To facilitate obtaining the effect of uniform intensity distribution, there may be at least one periodic irregularity 40 in the regions 15*a* to 15*d* of the outer circumferential surface (emission surface) 15 respectively facing the reflective arc surfaces 31*a* to 31*d* and in the region 15*g* corresponding to the transmissive surface 33. The periodic irregularities 40 may include a plurality of recesses 41 or protrusions 42 in the regions 15*a* to 15*d* and 15*g* respectively facing the reflective arc surfaces 31*a* to 31*d* and the transmissive surface 33. The rays 71 reflected by each of the reflective surfaces 31*a* to 31*d* are incident on the emission surface having two or more recesses 41 and/or protrusions 42 on the outer surface 15. The number of irregularities corresponding to each of the reflective surfaces 31*a* to 31*d* may be appropriately selected. Selecting the period (pitch) such that at least one combination of the recess 41 and the protrusion 42 corresponds to each of the reflective surfaces 31*a* to 31*d* enables designs of the emission surface 15, which is the outer surface of the optical element 11, and the number (number of levels) of the reflective surfaces 31 constituting the inner surface 16 to be separately developed, so that design flexibility of the optical element 11 is increased.

Similarly, the regions 15*a* to 15*d* of the emission surface 15 respectively facing the reflective arc surfaces 31*a* to 31*d* may have at least two inflection points 45 in a cross section in the direction along the first axis 12. This is similar for the region 15*g* corresponding to the transmissive surface 33. If each of the regions 15*a* to 15*d* and 15*g* of the outer circumferential surface 15 has at least two inflection points 45, each region has at least a shape changing from concave to convex and from convex to concave or a shape changing from convex to concave and from concave to convex. Accordingly, the rays 71 that have reached the outer surface 15 alternately converge and diverge instead of being converted into parallel rays in the direction along the first axis 12 on the outer surface 15. When the rays reach the illuminated region 2, a portion of the illuminated region 2 is illuminated with the illumination light 3 emitted through the various regions 15*a* to 15*d* and 15*g* of the emission surface 15, and the intensity distribution (luminance distribution) of illumination becomes uniform.

FIG. 16 schematically shows general travel of rays of light through the optical element 11 having the shape of a sine wave along the Z-axis 12 as the periodic irregularities 40 as an example. Among the irregularities 40, the recesses 41 function as concave lenses to allow light to diverge, and the protrusions 42 function as convex lenses to allow light to converge. Accordingly, light reflected by the reflective surfaces 31*a* to 31*d* and emitted from the outer surface 15 has alternate regions of convergence and divergence. Rays reflected by one reflective surface toward the emission surface follow different optical paths of convergence and divergence, so that the quality of the illumination unevenness can be improved.

The emission surface 15 may include a portion that controls the light distribution of the illumination light 3 emitted through the emission surface 15 around the first axis 12, that is, a portion in which the period or amplitude of the periodic irregularities or the positions or intervals of inflection points change around the Z-axis. The shape of the outer surface 15 of the optical element 11 may be selected according to the position at the angle θ around the Z-axis to further control the light distribution in the Z-axis direction (vertical direction) at each location in the horizontal direction (X-Y plane) orthogonal to the Z-axis 12. As shown in FIG. 13B and FIG. 14, the optical element 11 of the illumination device 1*c* has the periodic irregularities 40 designed so that the light distributions at each of locations at angles θ1 of 0°, 15°, 30°, and 45° with respect to the center θ0 in a plan view of a plane (X-Y plane) orthogonal to the Z-axis 12 will be uniform in the vertical direction (Z-axis direction). Accordingly, the optical element 11 may have portions (regions) 15*x* having a different amplitude and/or period of the periodic irregularities 40 of the emission surface 15 at angles θ1 of 0°, 15°, 30°, and 45°. Portions of the emission surface 15 between locations at these angles can be designed such that irregularities 40 of adjacent cross sections are connected to form a seamless surface.

Basically, the emission surface 15 of the optical element 11 can be designed irrespective of the shape of the inner surface 16 including the TIR prisms 39. Accordingly, the design of the emission surface 15, which is the outer surface, can be changed without changing the design of the inner surface 16. Thus, the optical element 11 that can appropriately control the light distribution in the vertical direction according to the distance from the illuminated region 2 or the like to obtain the luminance distribution in the longitudinal direction (horizontal direction) in the illuminated region 2 can be obtained. The emission surface 15 may be designed to be symmetric about the center θ0 in the horizontal direction (opening angle θ1) or may be designed to be asymmetric regarding the illuminated region 2.

In the optical element 11, the inner surface 16 includes the reflective arc surfaces 31*a* to 31*d*, each including concentric arc-shaped reflective surfaces (total internal reflection surfaces) centered on the first axis 12, and also includes the transmissive surfaces 32*a* to 32*d* respectively corresponding to the reflective surfaces 31*a* to 31*d*. Accordingly, the inner surface 16 of the optical element 11 includes the multilevel TIR (total internal reflection) prisms 39.

The optical device 10 further includes a control member 79 that prevents the component of the first light 7 on the optical axis 7*a* from being directly incident on the first reflective surface 31. The control member may be a control member that shields (absorbs) light or may be a control member that reflects or diffuses light. The optical device 10 in the present example includes a fan-shaped light-shielding or nonreflective control member 79 protruding from the first axis 12 at the top of the bent mirror 20 along the first axis 12. The control member 79 absorbs a portion, such as a component with an elevation φ1 (elevation in a range of 80° to 90°), of the first light 7 from the LED 6 around the optical axis 7a to so that the component with an elevation φ1 is not incident on the optical element 11. The control member 79 may have a mirror surface or scattering surface having the shape of an inverted cone extending along the first axis 12, or may be configured to appropriately allow the component with the elevation φ0 to be incident on the optical element 11.

Figure 17:
FIG. 17 schematically shows the incidence efficiency of light from a light source of the illumination device.

FIG. 17 is a graph showing the incidence efficiency of light incident on the reflective surfaces 31 along the Z-axis (first axis) 12 according to the elevation φ. The incidence efficiency is 97% at an elevation φ of 80°. Accordingly, it can be understood that the optical loss is about 3% even if light in the range of elevations φ of 80° to 90°, that is, at such elevations φ1 that the light travels directly upward from the LED 6, is not incident.

On the other hand, as indicated by the dashed lines in FIG. 16, the volume required to form a reflective surface 31x that reflects light including light at elevations of 80° to 90° to another angle, such as a direction perpendicular to the Z-axis 12, with respect to the Z-axis 12 corresponds to about 15% of the total volume of the optical element 11. As shown in FIG. 16, in the optical element 11 of the present example, the surface 31a that reflects light except for light at elevations φ of 80° to 90° (elevation φ1) is employed instead of the reflective surface 31x including a surface that reflects light at the elevation φ1, which allows reduction in thickness and size. Accordingly, with this optical element 11, the compact optical device 10 and illumination device 1c in which the efficiency of conversion of the light from the LED 6 into the illumination light 3 hardly decreases can be provided.

As described above, the optical element 11 includes the first reflective surface 31 that reflects the first light 7 emitted from the LED 6 and having the Lambertian light distribution at an angle different from the angle of the optical axis 7a of the first light 7, generally in a direction orthogonal to the optical axis 7a, to a predetermined region (first region) with the angle θ around the optical axis 7a to control the intensity distribution of light; and the cylindrical or arc-shaped emission surface 15 that can be designed irrespective of the reflective surfaces 31 and that refracts and emits the reflected rays 71 to emit the illumination light 3 having a shape and intensity distribution that agree with the illuminated region 2. Further, providing the periodic irregularities 40 in the longitudinal direction (vertical direction) on the cylindrical or arc-shaped emission surface 15 allows for controlling the divergence and intensity distribution of the illumination light 3 in the vertical direction (Z direction). Also, adjusting the shape of the emission surface 15 in the circumferential direction allows for controlling the divergence and intensity distribution in the circumferential direction (horizontal direction or XY direction). Accordingly, the optical device 10 and the illumination device 1 including this optical element 11 can emit the illumination light 3 that can more uniformly illuminate the entire regions 2 having various regions, shapes, or constitutions.

Figure 18A:
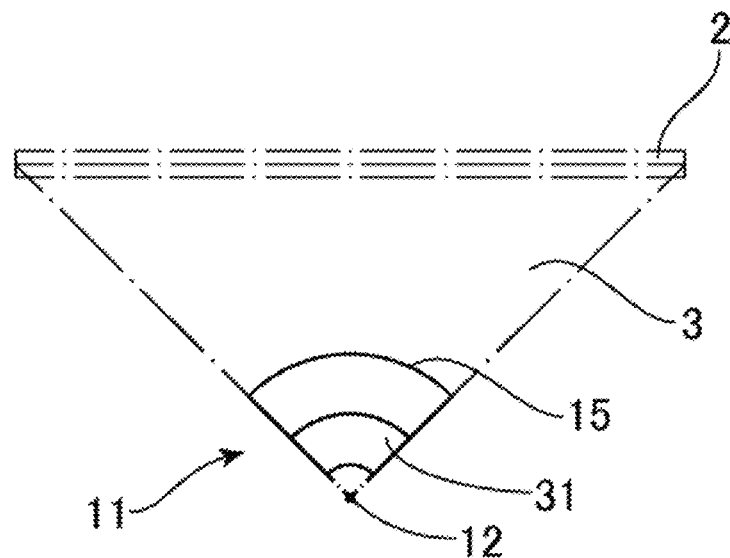
FIG. 18A and FIG. 18B are a schematic plan view and a schematic cross-sectional view, respectively, showing an example of relationship between a region to be illuminated and an optical element.
Figure 18B:
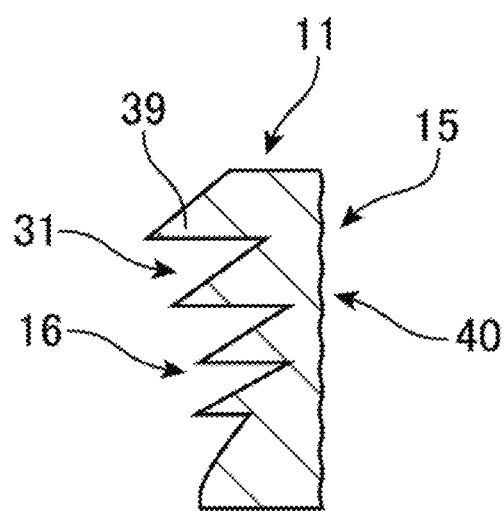

FIG. 18A to FIG. 21C schematically show several examples of the optical element 11 for the illumination device appropriate for regions 2 having various shapes or constitutions. The optical element 11 shown in FIGS. 18A and 18B emits illumination light 3 with a normal divergence, what is called a medium light distribution, in the horizontal direction. As shown in FIG. 18A, the outer surface (emission surface) 15 of the optical element 11 has the arc shape extending around the first axis 12 at the center. As shown in the schematic cross-sectional view of FIG. 18B, the emission surface 15 of the optical element 11 has the periodic irregularities 40 for controlling the divergence of the illumination light 3 in the vertical direction along the first axis 12.

Figure 19A:
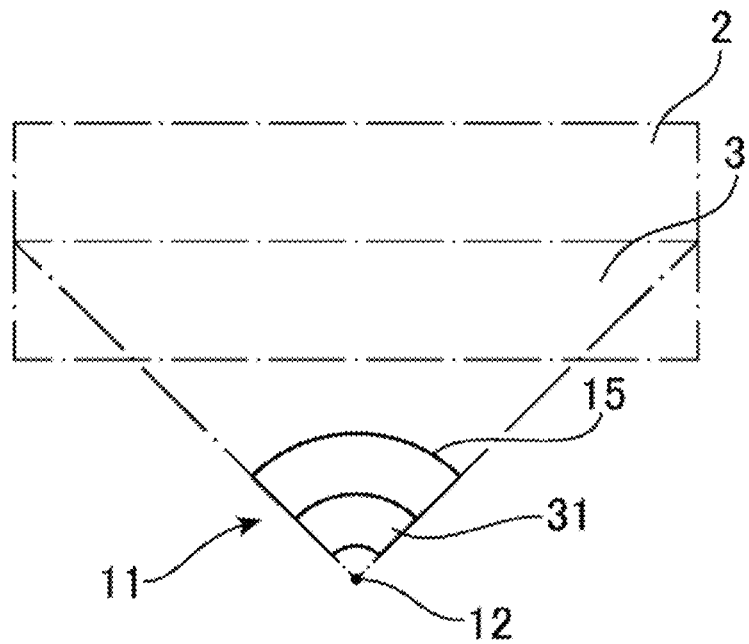
FIG. 19A, FIG. 19B, and FIG. 19C are a schematic plan view, a schematic cross-sectional view, and another schematic cross-sectional view, respectively, showing various examples of a relationship between a region to be illuminated and an optical element.
Figure 19B:
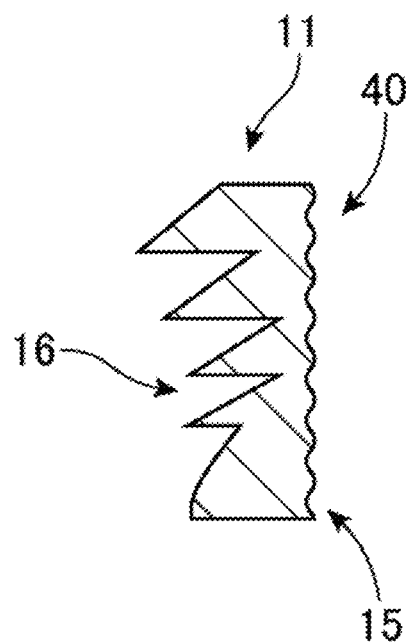
Figure 19C:
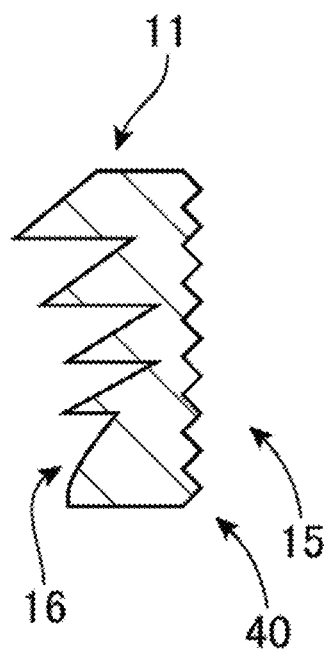

The optical element 11 shown in FIGS. 19A to 19C is an example of the optical element 11 that emits illumination light 3 with a medium light distribution or divergence in the horizontal direction while having a wide divergence in the vertical direction along the first axis 12. As shown in FIG. 19A, the outer surface (emission surface) 15 of the optical element 11 has an arc shape extending around the first axis 12 at the center. As shown in the schematic cross-sectional view of FIG. 19B, the amplitude (such as the distance, height, or sag between the peak of a protrusion 42 and the bottom of a recess 41) of the periodic irregularities 40 on the emission surface 15 of the optical element 11 may be larger than the amplitude of the irregularities 40 shown in FIG. 18B. The periodic irregularities 40 may be a collection of curved surfaces like a sine wave as shown in FIG. 19B or may be a collection of straight lines (slopes) at different angles like a zigzag as shown in FIG. 19C.

Figure 20A:
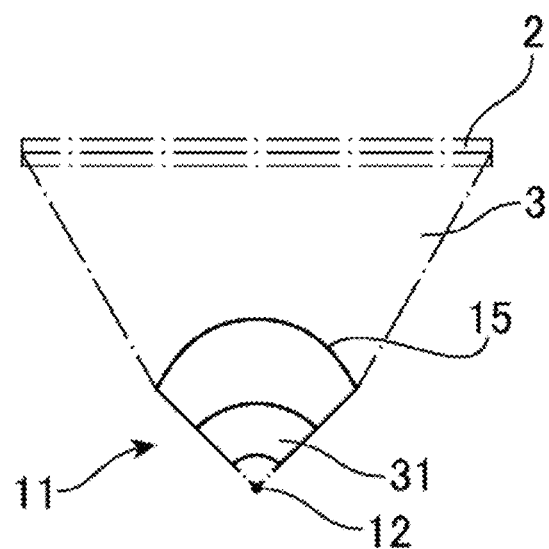
FIGS. 20A to 20C schematically show various examples of a relationship between a region to be illuminated and an optical element, in which FIG. 20A schematically shows an optical element with a narrow light distribution, FIG. 20B schematically shows an optical element with a broad light distribution, and FIG. 20C schematically shows an optical element appropriate for illuminating a circular region.
Figure 20B:
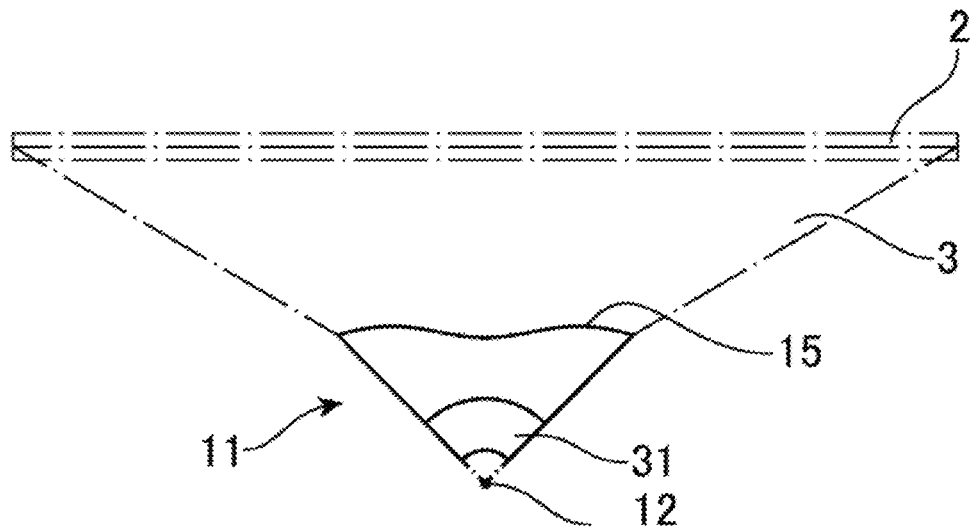
Figure 20C:
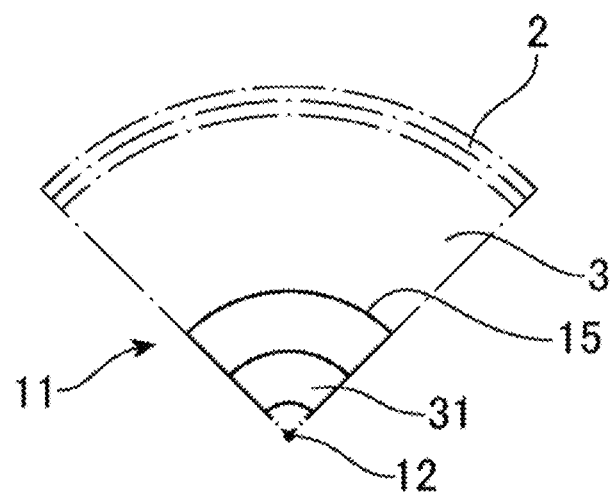

The optical element 11 shown in FIG. 20A is an example suitable for illumination of a region 2 that is narrow in the horizontal direction. The emission surface 15 of the optical element 11 has a shape, such as a surface with a large curvature (small curvature radius), appropriate for emitting illumination light 3 with a narrow light distribution. The optical element 11 shown in FIG. 20B is an example appropriate for illumination of a region 2 that is large (long) in the horizontal direction. For example, the light distribution angle is increased by providing one or more irregularities also in the circumferential direction. As shown in FIG. 20B, the emission surface 15 can be designed to be recessed at an opening angle of 0° and to be protruded on both sides in a cross section (cross section in the horizontal direction or in a plan view) in a direction perpendicular to the first axis 12. The optical element 11 having the emission surface 15 having a bifoliolate or protruded-recessed-protruded shape in a cross section in the horizontal direction is appropriate for emitting illumination light 3 with a broad light distribution for illuminating the region 2 that is long in the horizontal direction. The optical element 11 shown in FIG. 20C is an example suitable for illumination of a linear region 2 extending in the circumferential direction on the inner surface of a cylindrical column.

Figure 21A:
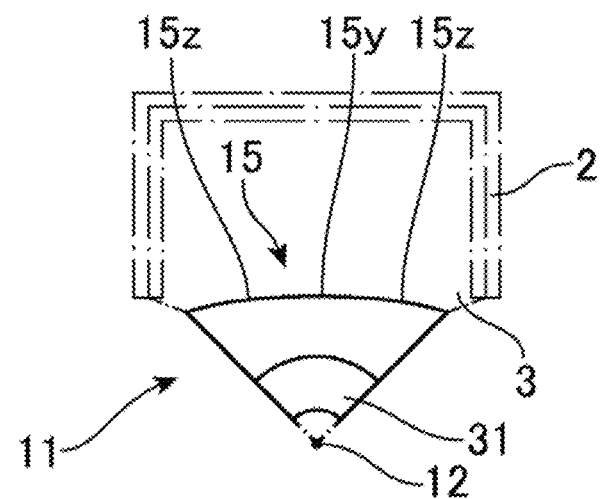

The optical element 11 shown in FIG. 21A is an example appropriate for illumination of a three-dimensional surface (region) 2 constituted of a plurality of linear surfaces combined into a U-like shape. The emission surface 15 of the optical element 11 includes, in a cross section in a direction perpendicular to the first axis 12, a portion 15y that forms a straight line or a curved line convex or concave with a large curvature radius at the position at an opening angle of 0° facing the center of the U-like shape; and recessed portions 15z corresponding to positions of the U-like shape bent at a right angle. Employing such a shape of the emission surface 15 enables provision of the optical element 11 appropriate for linear and uniform illumination of the U-shaped inner wall.

Figure 21B:
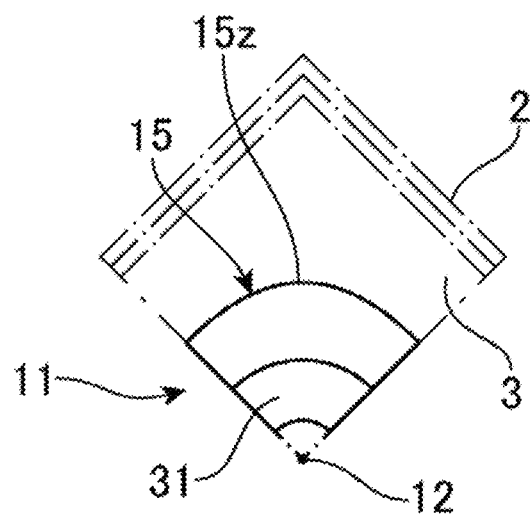

The optical element 11 shown in FIG. 21B is an example appropriate for illumination of a three-dimensional surface (region) 2 constituted of a plurality of linear surfaces combined into a V shape. The emission surface 15 of the optical element 11 has, in a cross section in a direction perpendicular to the first axis 12, a convex portion 15z convex toward a portion corresponding to the position at which the surfaces intersect each other to form a V shape. Employing such a shape of the emission surface 15 enables provision of the optical element 11 appropriate for linear and uniform illumination of the V-shaped inner wall.

Figure 21C:
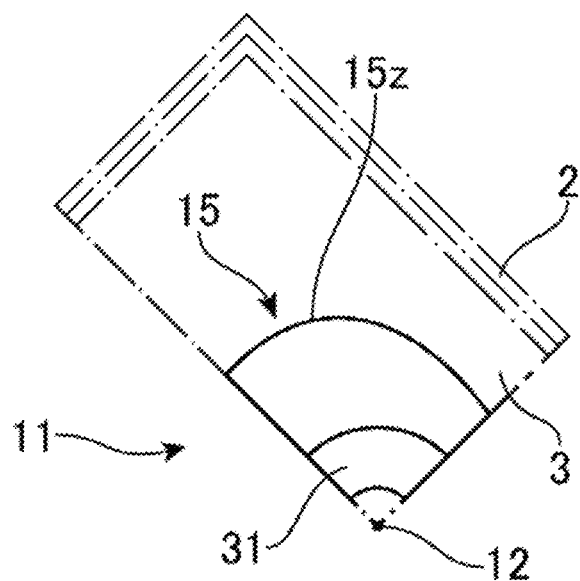

The optical element 11 shown in FIG. 21C is an example appropriate for illumination of a three-dimensional surface (region) 2 constituted of a plurality of linear surfaces asymmetrically combined into an L shape. The emission surface 15 of the optical element 11 has, in a cross section in a direction perpendicular to the first axis 12, a protruding portion 15z protrudes toward a portion corresponding to the position at which the surfaces intersect each other to form the L shape. Employing such an asymmetric shape of the emission surface 15 around the first axis 12 enables provision of the optical element 11 appropriate for linear and uniform illumination of the L-shaped inner wall.

Controlling the shape of the emission surface (outer surface) 15 in a cross section in a direction along the first axis 12 and the shape of the emission surface 15 in a cross section in a direction perpendicular to the first axis 12 as described above allows for emitting the illumination light 3 having different light distribution characteristics. Thus, the illumination device 1 including the optical element 11 having the emission surface 15 can more uniformly illuminate linear illuminated regions 2 with various constitutions.

Figure 22:
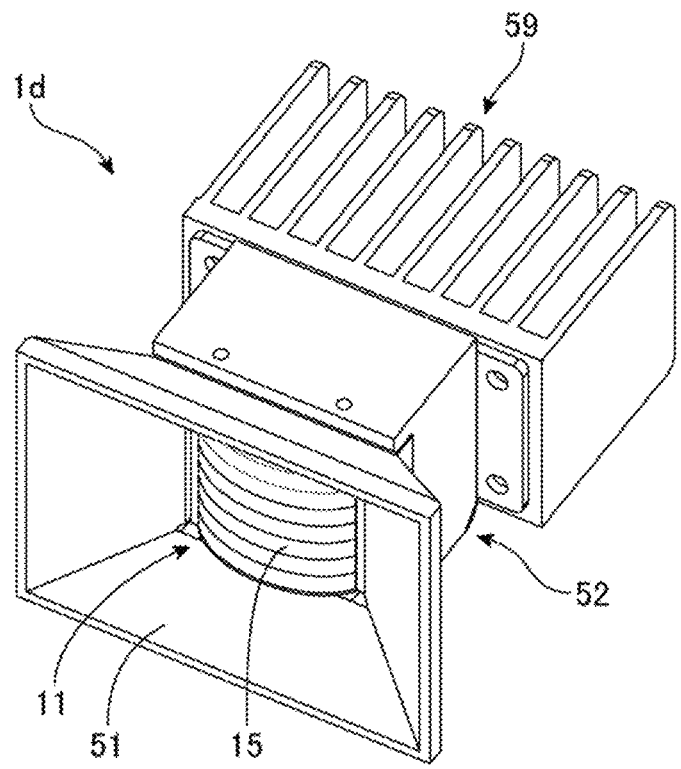
FIG. 22 is a schematic perspective view of even another example of illumination device.
Figure 23:
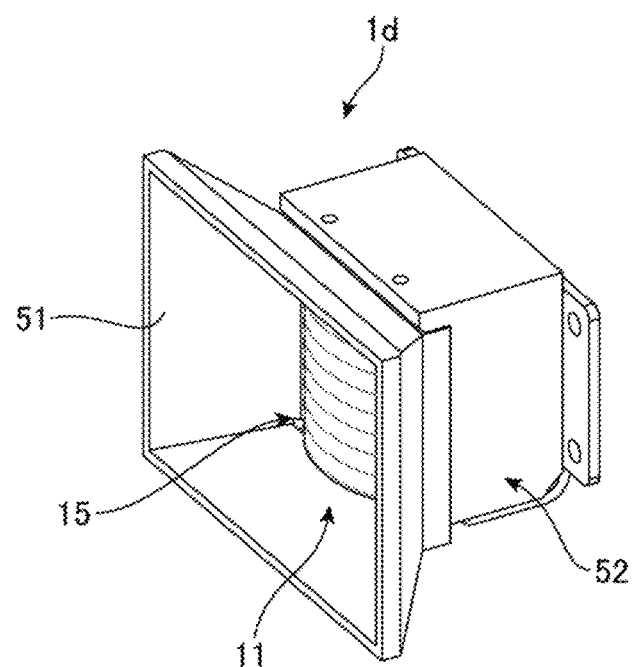
FIG. 23 is a schematic perspective view of the illumination device shown in FIG. 22 in which illustration of a heat dissipating unit is omitted.
Figure 24:
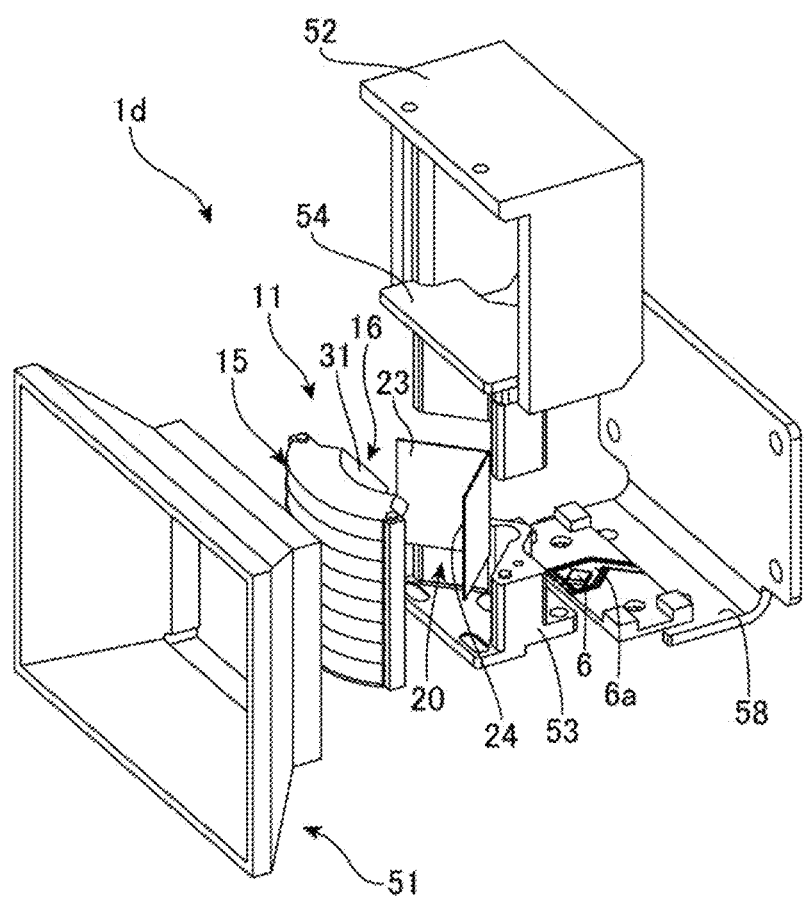
FIG. 24 is a schematic exploded view of the illumination device shown in FIG. 23.

FIG. 22 schematically shows an illumination device 1d, which is even another example of the illumination device. FIG. 23 schematically shows the illumination device 1d without illustration of a radiating fin 59 that has been attached, and FIG. 24 schematically shows the illumination device 1 disassembled into constituents. The illumination device 1d is one example of a modular lighting tool and includes a light-shielding mask 51 covering the periphery of the emission surface 15 constituting the front surface (outer surface) of the optical element 11. The light-shielding mask 51 covering the periphery of the emission surface 15 outside the emission surface 15 has the function of reducing glare and stray light. The illumination device 1 includes the optical element 11 having the first reflective surface 31 in the inner surface 16, the bent mirror (sheet-metal mirror) 20 having the second reflective surface 23 and the third reflective surface 24 between which the inner surface 16 of the optical element 11 is located, the quadrangular flared light-shielding mask 51 covering the periphery of the emission surface 15 of the optical element 11, resin casings 52, 53, and 54 used for assembling the optical element 11, the sheet-metal mirror 20, and the mask 51, the substrate 6a on which the LED 6 serving as the light source has been mounted, and a sheet-metal heat spreader 58 that supports the substrate 6a and transfers heat from the LED 6 to the radiating fin 59.

Figure 25A:
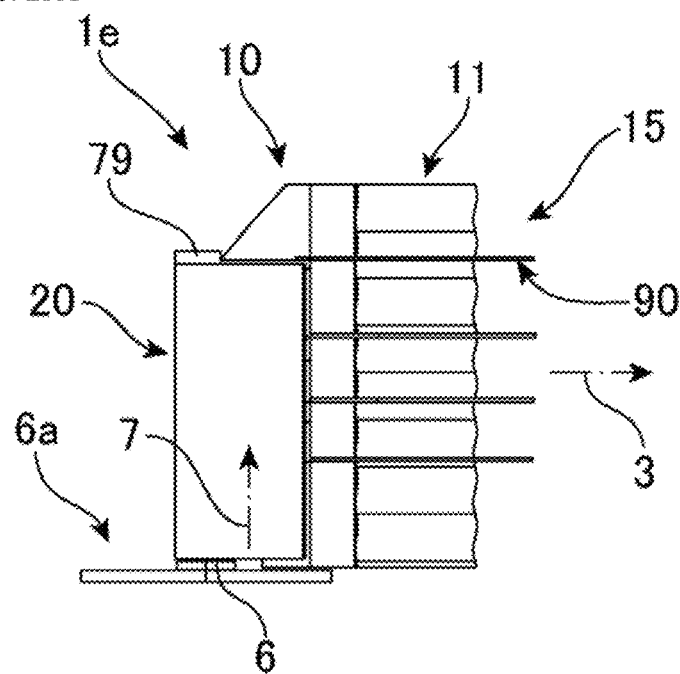
FIG. 25A and FIG. 25B are a schematic side view and a schematic plan view, respectively, of further another example of the illumination device.
Figure 25B:
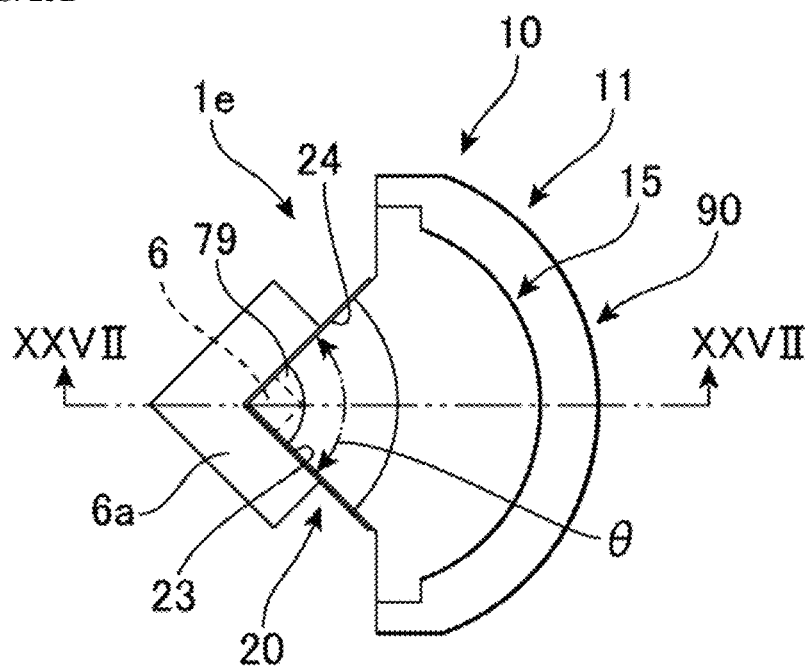
Figure 26:
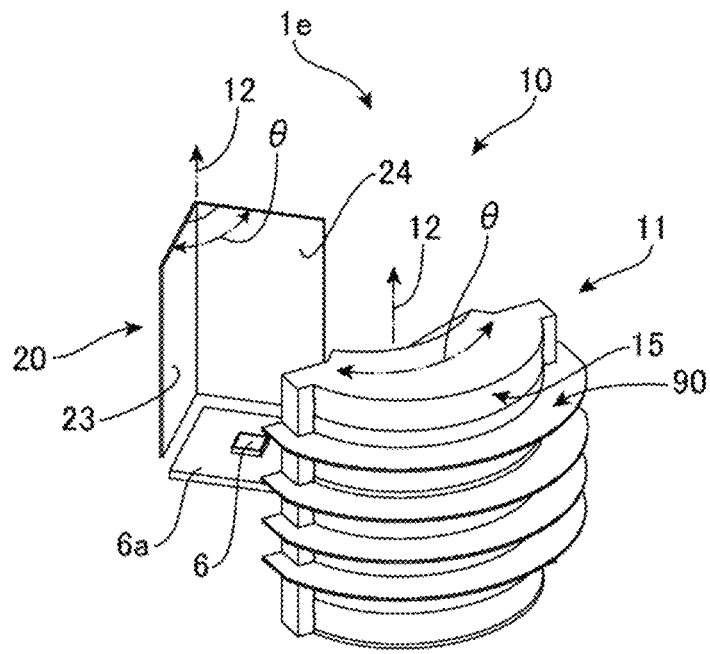
FIG. 26 is a schematic exploded view of the illumination device shown in FIGS. 25A and 25B showing individual elements.
Figure 27:
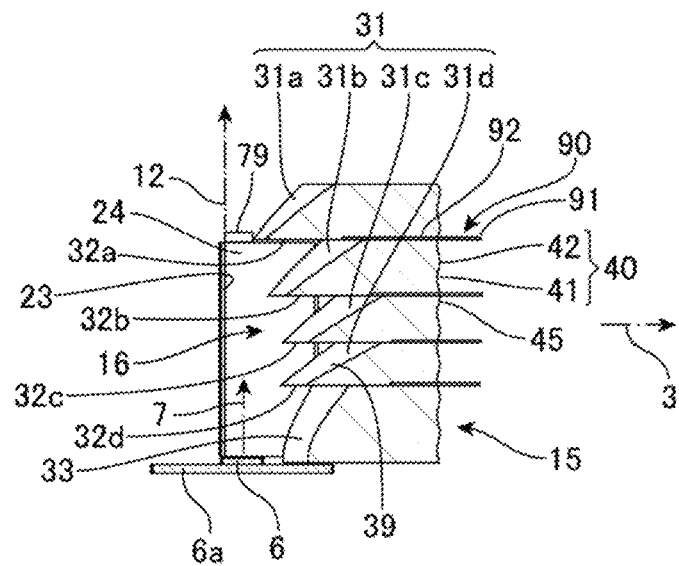
FIG. 27 is a schematic cross-sectional view of the illumination device shown in FIGS. 25A and 25B.

FIG. 25A is a schematic side view of an illumination device 1e, which is further another example of the illumination device. FIG. 25B is a schematic top view of the illumination device 1e. FIG. 26 schematically shows an exploded view of the illumination device 1e. FIG. 27 is a schematic cross-sectional view of the schematic structure of the illumination device 1e taken along the line XXVII-XXVII (see FIG. 25B) along the center of the illumination device 1e. The illumination device 1e includes the optical device 10 that converts the light (first light) 7 from the LED 6 serving as the light source into the illumination light 3 and emits the light, and the substrate 6a on which the LED 6 that emits the first light 7 has been mounted. The optical device 10 has the first reflective surface 31 disposed to reflect at least a portion of the first light 7 incident along the first axis (Z-axis) 12 and having a Lambertian light distribution with the optical axis 7a parallel to the first axis 12 toward a substantially arc-shaped first region with the angle θ around the first axis 12 to obtain substantially collimated rays 71 in a direction perpendicular to the optical axis 7a (first axis (Z-axis) 12); the second reflective surface 23 and the third reflective surface 24 intersecting each other on the first axis 12 with the first reflective surface 31 located between the second reflective surface 23 and the third reflective surface 24; the light-transmissive emission surface 15 adapted to refract at least a portion of the rays 71 reflected by the first reflective surface 31 to emit the rays around the first axis 12; and a plurality of light-shielding louvers 90 protruded from the emission surface 15.

The constitution of the optical device 10 is substantially the same as in the above example except that the louvers 90 are included, and the optical device 10 includes the bent mirror 20 having the second reflective surface 23 and the third reflective surface 24 and the light-transmissive optical element 11 including the first reflective surface 31 in the inner surface 16 and the emission surface 15 serving as the outer surface. The optical element 11 has the multilevel inner surface 16 including the reflective arc surfaces 31a to 31d and the transmissive surfaces 32a to 32d respectively corresponding to the reflective arc surfaces 31a to 31d inside the optical element 11, and has the emission surface 15 having the periodic irregularities 40 and/or a plurality of inflection points 45 at an outer region of the optical element 11. The optical element 11 is a substantially fan-shaped light-transmissive member with an angle θ of 180° or less or less than 180° around the first axis 12 in a cross section perpendicular to the first axis 12. The reflective arc surfaces 31a to 31d and the transmissive surfaces 32a to 32d respectively corresponding to the reflective arc surfaces 31a to 31d constitute the total internal reflection (TIR) prisms 39, and the multiple TIR prisms 39 are arranged along the first axis 12 to constitute the inner surface 16 of the optical element 11.

Figure 28:
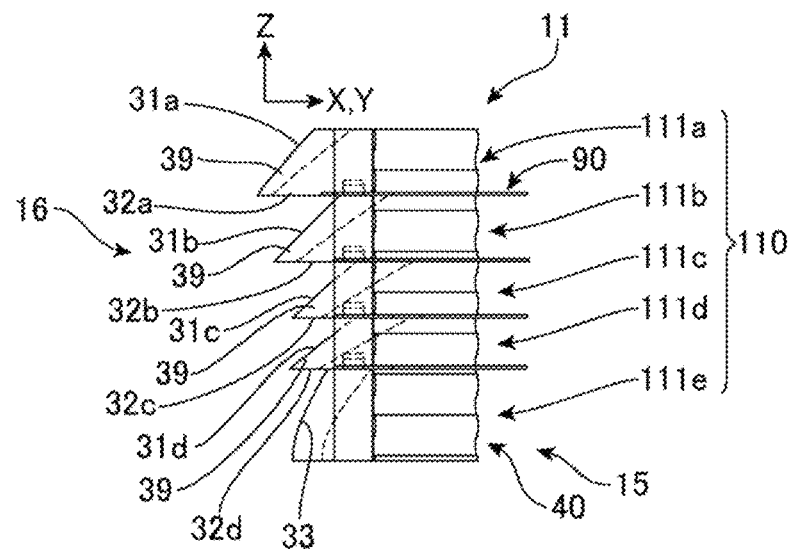
FIG. 28 is a schematic side view of an optical element.
Figure 29:
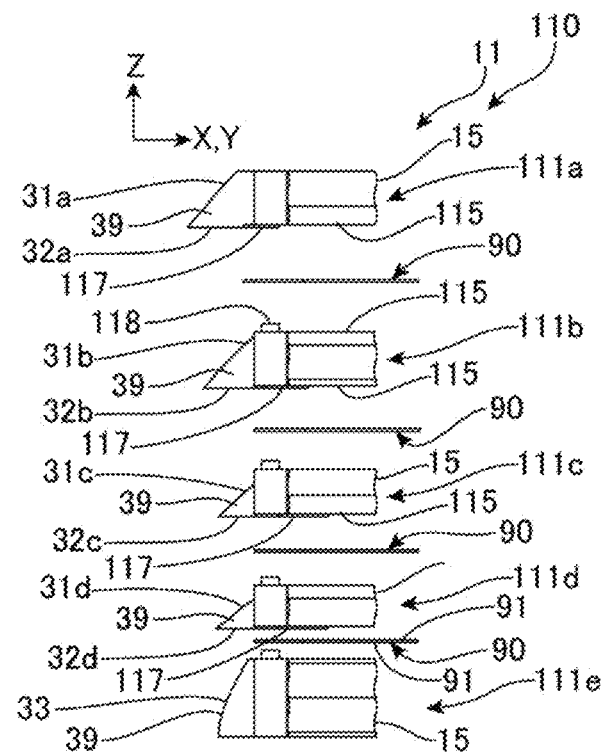
FIG. 29 is a schematic side view of the optical element divided into parts.
Figure 30A:
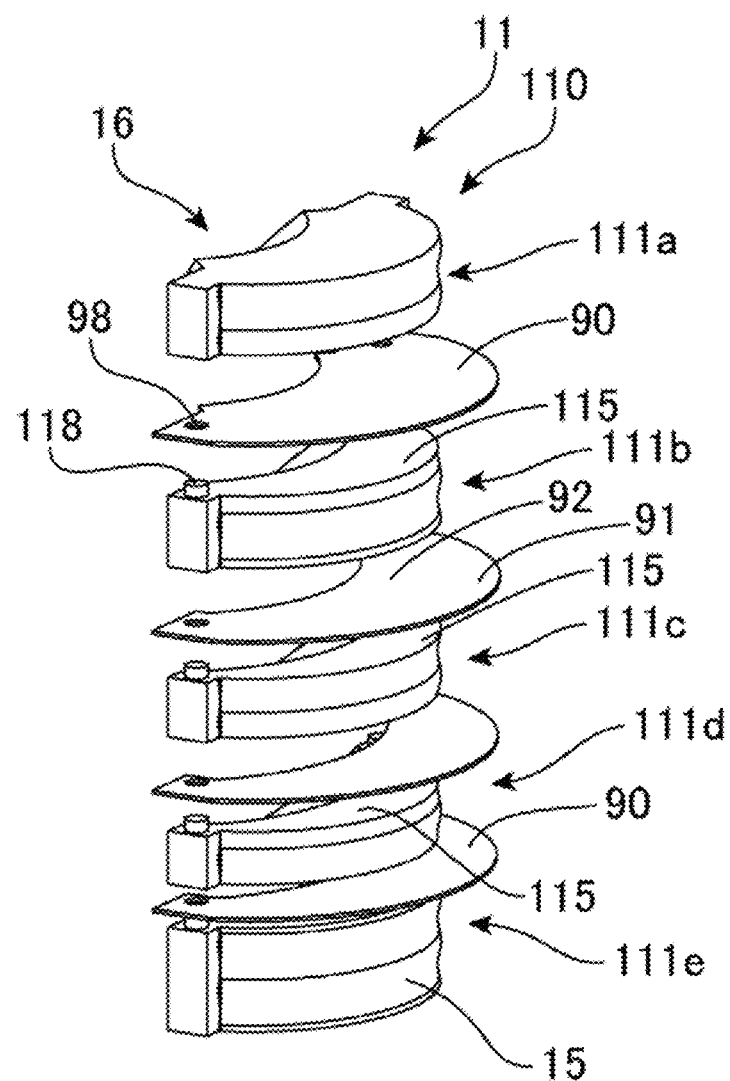
Figure 30B:
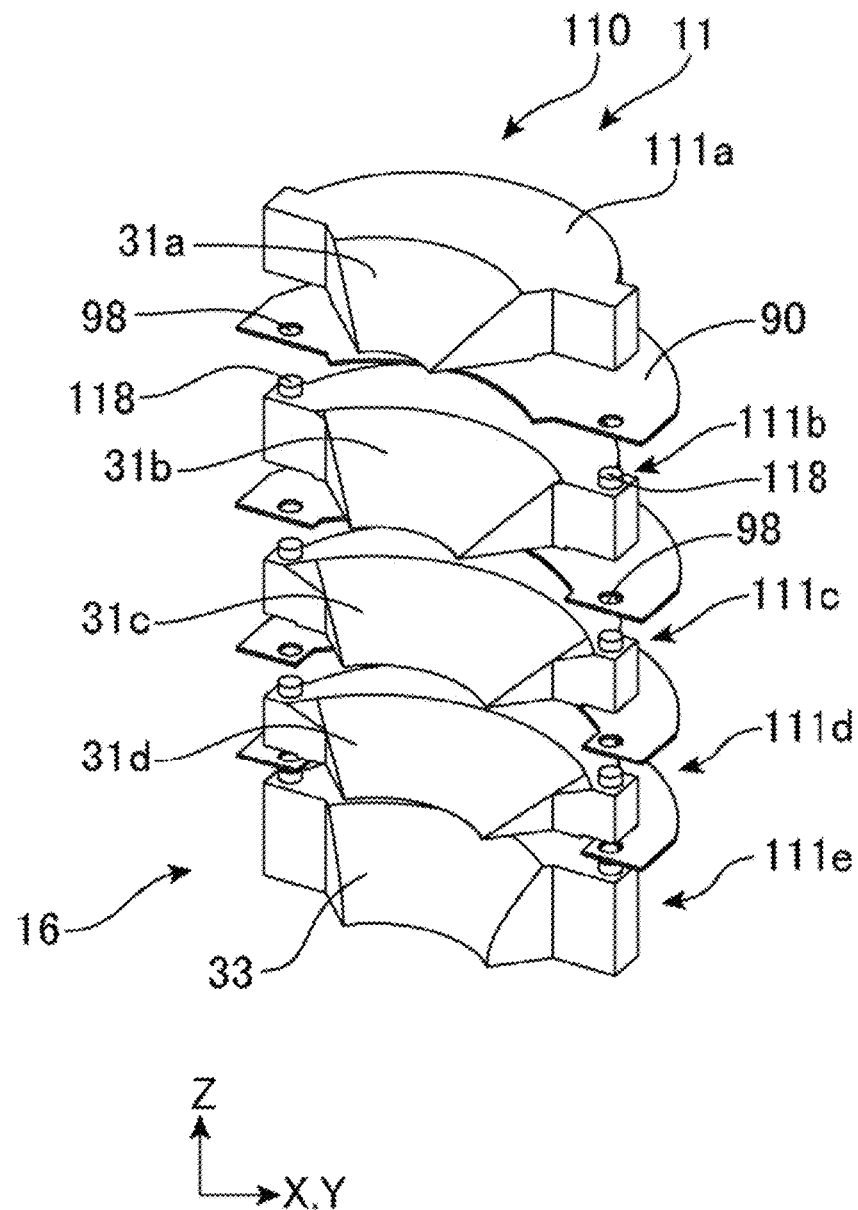
Figure 30C:
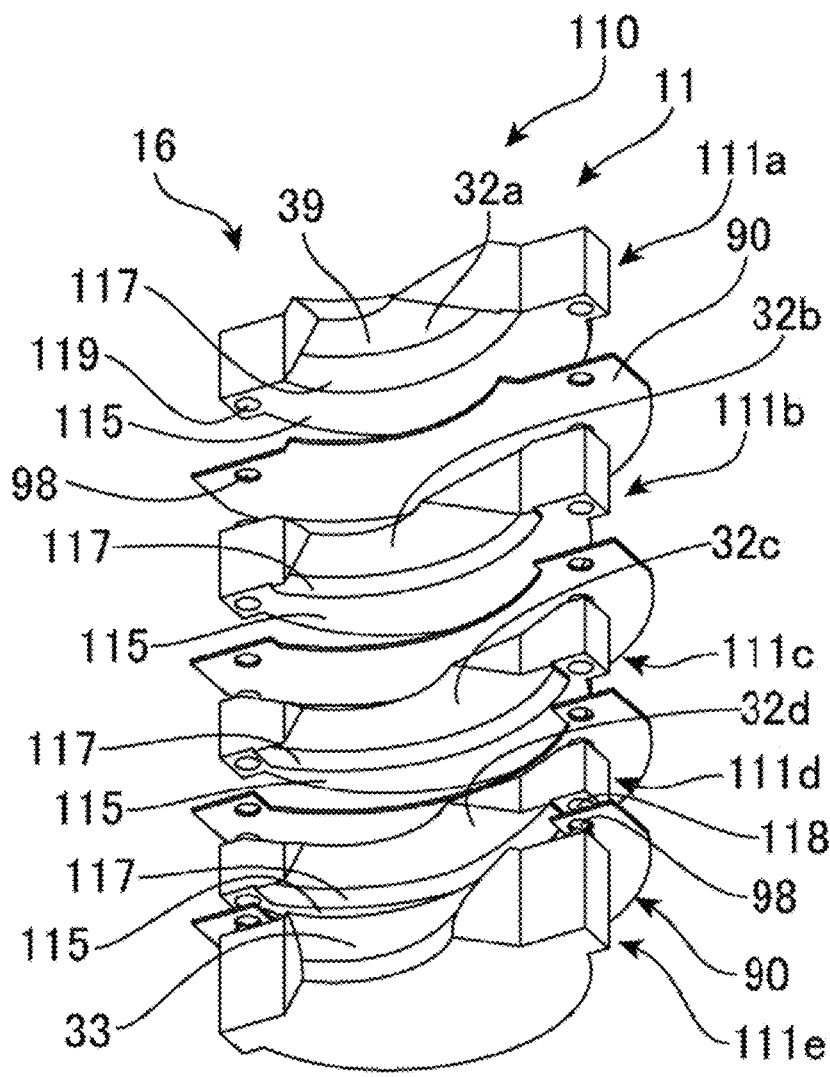

FIG. 28 schematically shows the optical element 11. FIG. 29 is a schematic side exploded view, and FIGS. 30A to 30C are schematic perspective exploded view of the optical element 11, showing a plurality of light-transmissive members 111a to 111e, which may be referred to as "parts 111a to 111e". FIG. 30A is a schematic exploded view of the optical element 11 as viewed from the emission surface (outer surface) 15 side. FIG. 30B is taken from the upper side of the inner surface 16, that is, from the side opposite to the incident side of the first axis (Z-axis) 12 from which the first light 7 enters. FIG. 30C is taken from the lower side of the inner surface 16, that is, from the incident side of the first axis 12.

Each of the light-transmissive members (parts) 111a to 111e has an end surface 115 perpendicular to the first axis (Z-axis) 12, and the optical element 11 includes an assembly 110 in which the parts 111a to 111e are layered along the first axis 12. The optical element 11 is divided into the parts 111a to 111e along the X-Y plane along the Z-axis 12 at respective positions of the concentric arc-shaped fan-shaped transmissive surfaces 32a to 32d disposed stepwise. The assembly 110 includes the four parts 111a to 111d having substantially a fan-shape in a plan view, each of the four parts 111a to 111d including a single TIR prism 39 (single TIR prism) having a corresponding one of the transmissive surfaces 32a to 32d and a corresponding one of the reflective surfaces (reflective curved surfaces or reflective arc surfaces) 31a to 31d in a corresponding inner surface 16, and a single part 111e having a substantially fan shape in a plan view and having the transmissive portion 33 in a corresponding inner surface 16 without having the reflective surface. Each of the parts 111a to 111e has, at an outer surface 15, a structure constituting a corresponding portion of the periodic irregularities 40 constituting the outer surface 15 of the optical element 11 and respectively correspond to the reflective surfaces 31a to 31d and the transmissive portion 33 of the inner surface 16.

Each of the light-transmissive parts 111a to 111d includes at least one combination of a corresponding one of the reflective curved surfaces 31a to 31d functioning as the first reflective surface 31 and a corresponding one of the transmissive surfaces 32a to 32d, that is, at least one TIR prism 39. Each of the parts 111a to 111d may include a plurality of TIR prisms 39. Each of the parts 111a to 111d may have a corresponding one of the reflective curved surfaces 31a to 31d and a corresponding one of the transmissive surfaces 32a to 32d so as to include a single TIR prism 39. The TIR prisms 39 project toward the inner surface 16 of the optical element 11. When the optical element 11 has an arc shape, a plurality of TIR prisms 39 can be disposed. On the other hand, when the optical element 11 has a cylindrical or annular optical element as described in the example below, it is difficult to disposed a plurality of TIR prisms 39 in the inner surface, but having a structure separated into parts for respective ones of the TIR prisms 39 in the direction of the Z-axis 12 allows for easily manufacturing an optical element including a plurality of TIR prisms 39 inside the optical element.

The TIR prisms 39 constituting the inner surface 16 of the optical element 11 have the function of collimating the light 7 from the LED 6 incident along the Z-axis 12 toward a direction perpendicular to the Z-axis 12, but stray light may be produced inside a light-transmissive seamless optical element 11.

If stray light is emitted from the emission surface 15 of the optical element 11 and recognized at the outside, unintended regions may be illuminated, or glare may be caused when the stray light has entered the eye. With the optical element 11 having a structure in which the parts separated in the direction of the Z-axis 12 for respective TIR prisms 39 are assembled, the advantage of reducing generation of stray light for respective TIR prisms 39 can be obtained.

To prevent stray light produced in each of the parts 111a to 111e from being emitted through other ones of the parts 111a to 111e, the assembly 110 may include light-shielding members disposed between at least a portion of the parts 111a to 111e. Alternatively, at least a portion of the end surfaces 115 of the parts 111a to 111e perpendicular to the Z-axis 12 may be light-shielding surfaces, or these structures may be combined.

The assembly 110 constituting the optical element 11 in the present example includes the louvers 90 that are light-shielding members at least partially disposed between the respective light-transmissive parts 111a to 111e. The louvers 90 include portions 91 extending (protruding) from the emission surface 15 of the optical element 11 to shield stray light emitted from the emission surface 15 and portions 92 sandwiched between the parts 111a to 111e to shield stray light between the parts.

The assembly 110 includes the parts 111a to 111e having light-shielding regions 117 in at least a portion of the end surfaces 115. The light-shielding regions (portions) 117 may be formed when the parts 111a to 111e are shaped by a technique such as two-color molding, or desired portions may be treated such that the light-shielding property is imparted after the parts 111a to 111e are shaped.

Each of the parts 111a to 111e has joining portions on an end side of the outer surface 15 for stacking the parts 111a to 111e. More specifically, the uppermost part 111a has a recess structure 119 in a lower end surface of the uppermost part 111a, each of the intermediate parts 111b to 111d has a protruding structure 118 on an upper end surface 115 of each of the intermediate parts 111b to 111d and a recess structure 119 in a lower end surface of each of the intermediate parts 111b to 111d, and the lowermost part 111e has a protruding structure 118 on an upper end surface 115 of the lowermost part 111e. The protruding structures 118 and the recess structures 119 are engaged with each other via through-holes 98 of the louvers, each disposed between a respective one of the protruding structures 118 and a respective one of the recess structures 119, so as to constitute the assembly 110 including the parts 111a to 111e. Any appropriate configuration other than using the parts 111a to 111e may constitute the assembly 110. For example, a structure in which the structure described above is turned upside down may be employed, an adhesive or the like may be used, or the parts 111a to 111e may be surrounded and mechanically integrated by a frame or the like.

The assembly 110 may constitute the optical element 11 without the louvers. In the case in which the optical element 11 is made of a single member, a molded member is continuously present from the upper portion to the lower portion in the region near the Z-axis 12 to constitute a thick portion. With this structure, the solidification time in molding increases, and the mass productivity is decreased. When manufacturing a plurality of separate parts having the end surfaces 115 along the X-Y plane, the thick portion is not formed, and the mass productivity can be increased. Further, the light-shielding plates disposed between joining surfaces of the parts can shield stray light, similarly to the louvers described above. Each part may have a recess portion in the joining surface (end surface) 115 according to the thickness of the light-shielding plate.

Figure 31:
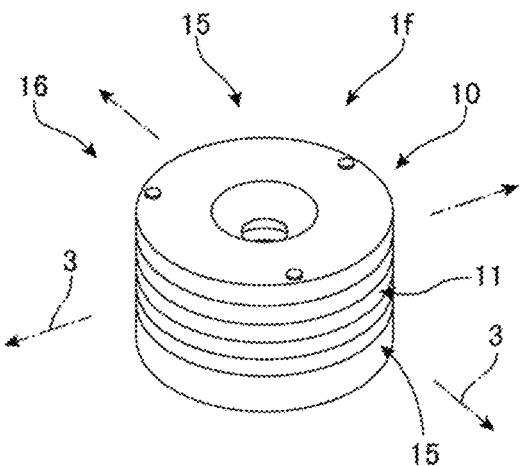
FIG. 31 is a schematic perspective view of still yet another example of the illumination device.
Figure 32A:
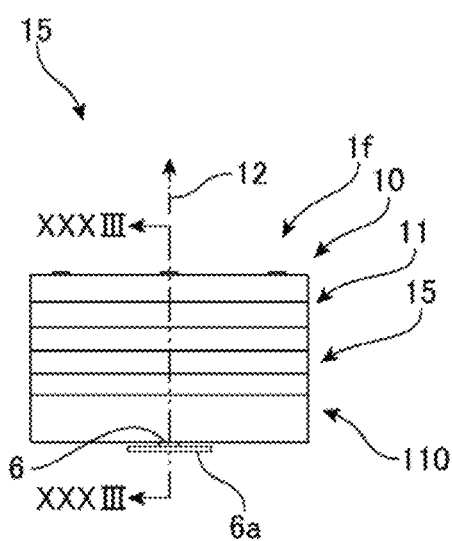
FIG. 32A and FIG. 32B are a schematic side view and a schematic plan view, respectively, of the illumination device shown in FIG. 31.
Figure 32B:
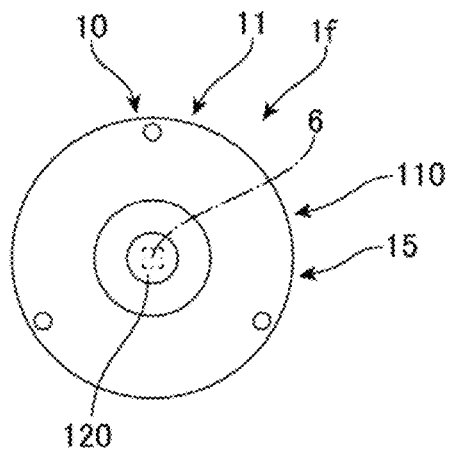

FIG. 31 schematically shows still yet another illumination device 1f. FIG. 32A is a schematic lateral view of the illumination device 1f. FIG. 32B is a schematic top view of the illumination device 1f.

Figure 33:
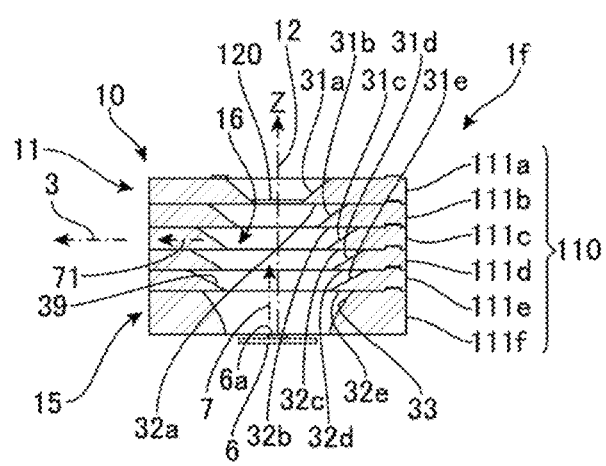
FIG. 33 is a schematic cross-sectional view of the illumination device shown in FIG. 31.
Figure 34:
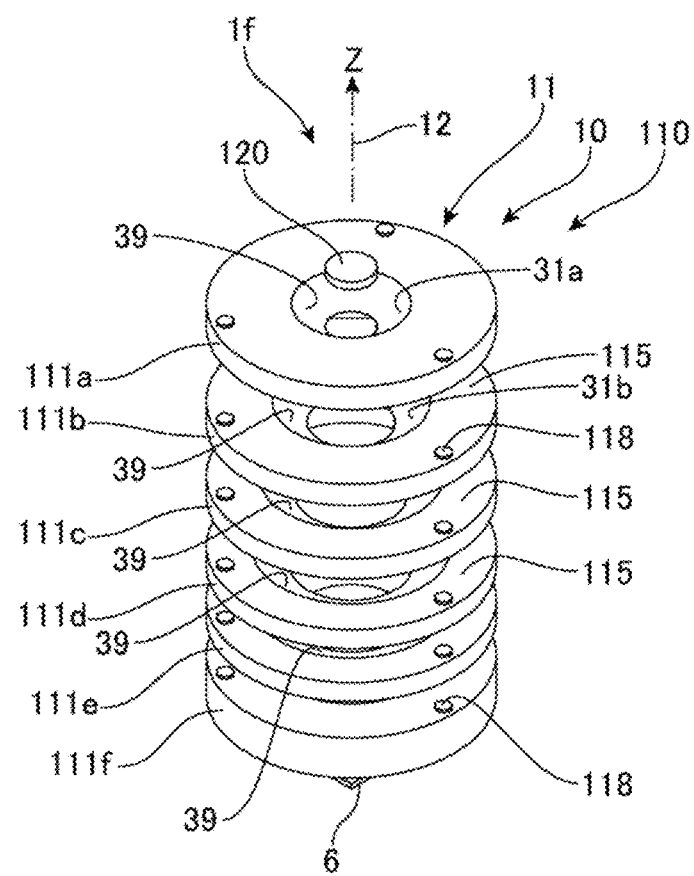
FIG. 34 is a schematic exploded view of the illumination device showing individual parts.

FIG. 33 is a schematic cross-sectional view of the schematic structure of the illumination device 1f taken along the line XXXIII-XXXIII (see FIG. 32A) along the center of the illumination device 1f. FIG. 34 schematically shows an exploded view of the illumination device 1f disassembled into parts. The illumination device 1f includes the optical device 10 that converts the light (first light) 7 from the LED 6 serving as the light source into the illumination light 3 and emits the illumination light 3, and the substrate 6a on which the LED 6 that emits the first light 7 is mounted. The optical device 10 includes the first reflective surface 31 disposed to reflect, to a circular (cylindrical) first region around the first axis 12 as substantially collimated rays 71 in a direction perpendicular to the optical axis 7a (first axis (Z-axis) 12), at least a portion of the first light 7 incident along the first axis (Z-axis) 12 and having a Lambertian light distribution with the optical axis 7a parallel to the first axis 12; and the light-transmissive emission surface 15 adapted to refract at least a portion of the rays 71 reflected by the first reflective surface 31 to emit the rays around the first axis (Z-axis) 12.

The illumination device 1f further includes a part (axial light processing member) 120 that processes light traveling along the Z-axis 12. The part 120 may be a light-shielding or reflective member so as to have substantially the same function as the control member 79 described above. The part 120 may have a function, such as the lens function and the light-diffusing function, of imparting optical performance as an illumination device. An illumination device that can illuminate not only the linear region but also a region including a broad region around the axis direction of the cylindrical optical element may be provided. The part 120 may have a disk shape, a tube shape, a sphere shape, a quadrangular shape, or the like and may be a sculpture of a human, an animal, a plant, a building, or the like made of a light-transmissive or diffusing material.

The optical device 10 includes the optical element 11 that has the multilevel inner surface 16 including the TIR prisms 39 constituted of the coaxial reflective curved surfaces 31*a* to 31*e* centered on the first axis 12 and arranged along the first axis 12 and the transmissive surfaces 32*a* to 32*e* respectively corresponding to the reflective curved surfaces 31*a* to 31*e*; and the outer surface 15 including a tubular emission surface. The emission surface (outer surface) 15 of the optical element 11 in the present example is cylindrical, but the emission surface 15 may be a polygonal tubular surface that is polygonal in a cross section in a plan view (plane perpendicular to the first axis 12) or may be a surface that has a continuous outline having a plurality of irregularities in a cross section. A cross section of the emission surface 15 in a direction along the first axis 12 may be a straight line or a surface having the periodic irregularities 40 or a plurality of inflection points 45 as described above.

Similarly to the optical element having the arc-shaped emission surface 15 described above, the optical element 11 includes the assembly 110 including a plurality of light-transmissive members (parts) 111*a* to 111*f* having end surfaces 115 perpendicular to the first axis 12. Each of the parts 111*a* to 111*f* has an annular shape and includes an annular TIR prism 39 on an inner surface 16, and its outer surface is an annular emission surface 15. The light-shielding portion 117 may be provided on a portion or whole of the end surface 115 of each of the parts 111*a* to 111*f*, or the louvers 90, which are light-shielding members, may be sandwiched between the parts 111*a* to 111*f* to constitute the assembly 110.

The illumination device 1*f* including the cylindrical optical element 11 is suitable for illumination of a linear region of a cylindrical surface (inner surface). Employing various shapes of the outer surface 15 of the optical element 11 in the illumination device 1*f*, as described referring to FIG. 20A to FIG. 21C, allows for obtaining an illumination device appropriate for illumination of a polygonal tubular inner surface or an elliptic inner surface can be provided. The optical element 11 described above has a tubular shape or the shape of a portion of a tubular shape in appearance and is appropriate for illumination of a narrow linear or quadrangular region 2. However, the optical element 11 may have a circular-conical shape or a shape of a portion of a circular cone or an egg-like shape or drum-like shape or a shape of a portion of these shapes suitable for illumination of a trapezoidal region 2 or illumination of a quadrangular or linear region 2 in a slant direction. Manufacturing and assembling the optical element 11 having a structure separated into a plurality of parts along the central axis (Z-axis) 12 enables provision of the optical element 11 having various shapes that collimates, in a direction perpendicular to the central axis 12, the light 7 incident from the LED 6 along the central axis 12 using the reflective surfaces 31 and emits the light as the illumination light 3 appropriate for the shape of an illuminated region 2 using the refracting surfaces of the outer surface.

Figure 35:
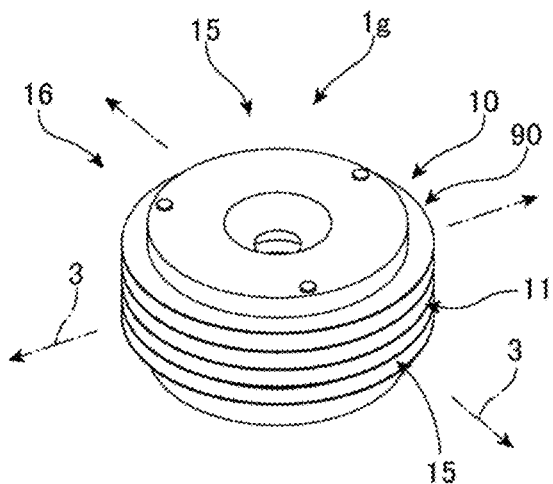
FIG. 35 is a schematic perspective view of even yet another example of the illumination device.
Figure 36A:
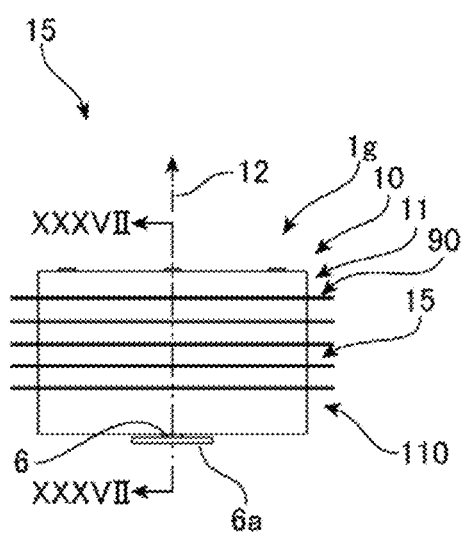
FIG. 36A is a schematic side view of the illumination device shown in FIG. 35.
Figure 36B:
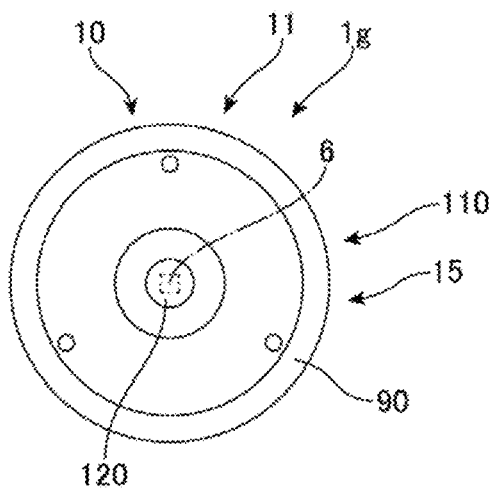
FIG. 36B is a schematic plan view of the illumination device shown in FIG. 35.
Figure 37:
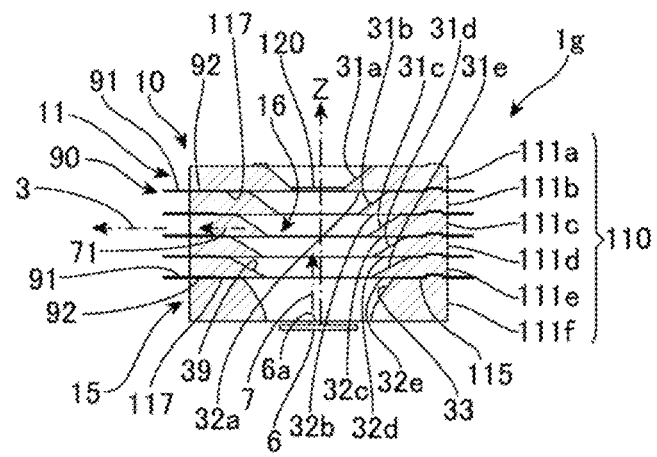
FIG. 37 is a schematic cross-sectional view of the illumination device shown in FIG. 35.
Figure 38:
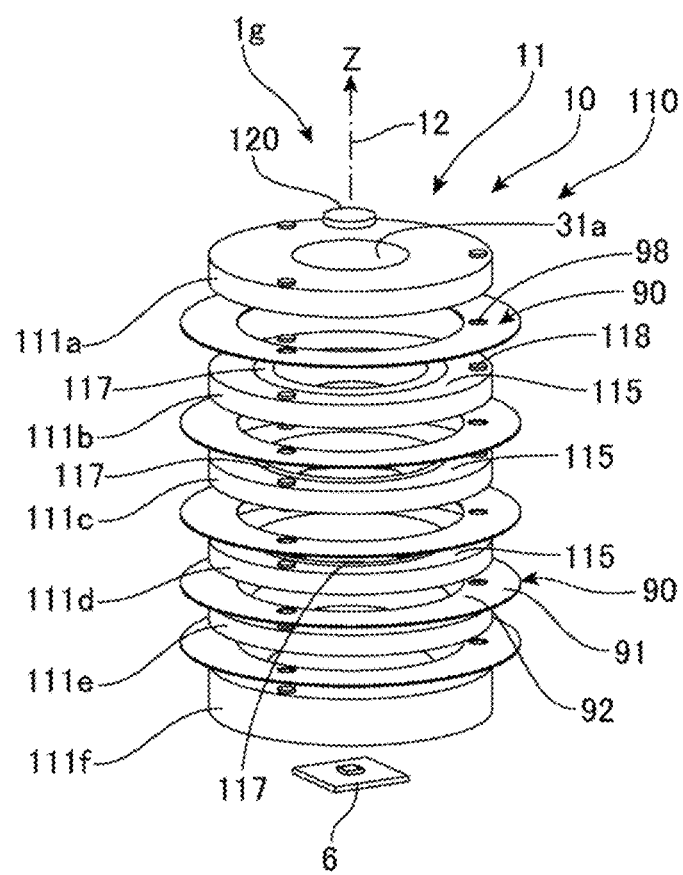
FIG. 38 is a schematic exploded view of the illumination device in FIG. 35 showing individual parts.

FIG. 35 schematically shows an illumination device 1*g*, which is even yet another example of the illumination device. FIG. 36A is a schematic side view of the illumination device 1*g*. FIG. 36B is a schematic top view of the illumination device 1*g*. FIG. 37 is a schematic cross-sectional view of the schematic structure of the illumination device 1*g* taken along the line XXXVII-XXXVII (see FIG. 36A) along the center of the illumination device 1*g*. FIG. 38 schematically shows the illumination device 1*g* disassembled into parts.

The illumination device 1*g* includes the optical device 10 that converts the light (first light) 7 from the LED 6 serving as the light source into the illumination light 3 and emits the illumination light 3, and the substrate 6*a* on which the LED 6 that emits the first light 7 is mounted. The optical device 10 includes the first reflective surface 31 disposed to reflect, to a circular (cylindrical) first region around the first axis 12 as substantially collimated rays 71 in a direction perpendicular to the optical axis 7*a* (first axis (Z-axis) 12), at least a portion of the first light 7 incident along the first axis (Z-axis) 12 and having a Lambertian light distribution with the optical axis 7*a* parallel to the first axis 12; the light-transmissive emission surface 15 adapted to refract at least a portion of the rays 71 reflected by the first reflective surface 31 to emit the rays around the first axis (Z-axis) 12; a plurality of light-shielding louvers 90 protruded from the emission surface 15; and the member 120 for processing light on the optical axis 7*a*.

The optical device 10 includes the optical element 11 having the multilevel inner surface 16 including a plurality of TIR prisms 39, the outer surface 15 including a tubular emission surface, and the louvers 90. The optical element 11 includes the assembly 110 including the light-transmissive members (i.e., parts) 111*a* to 111*f* equivalent to the respective parts in the above example and having the end surfaces 115 perpendicular to the first axis 12. The assembly 110 further includes the louvers 90 each disposed between the parts 111*a* to 111*f*. Each of the louvers 90 has a hollow disk shape, and includes the portions 91 for controlling stray light emitted from the emission surface 15 at an outer region of the optical element 11 and the portions 92 located between the parts 111*a* to 111*f* to shield stray light traveling between the parts 111*a* to 111*f*. Each of the light-transmissive members 111*a* to 111*f* may have a light-shielding portion 117 in an end surface 115 of each of the light-transmissive members 111*a* to 111*f* to shield stray light traveling between corresponding ones of the light-transmissive members 111*a* to 111*f* singly or in combination with the louvers 90.

The illumination device 1*g* including the cylindrical optical element 11 with the louvers is appropriate for illumination of, for example, a linear region of a cylindrical surface (inner surface). As described referring to FIG. 22 to FIG. 24, the illumination device 1*g* may be provided with a circular cover over the upper and lower sides of the emission surface 15. The illumination light 3 can be controlled by refraction by the emission surface 15 of the outer surface of the optical element 11 and by the louvers 90, and the illumination light 3 can be emitted according to the shape of the region to be illuminated.

In the examples described above, the optical element 11 having the inner surface 16 including the first reflective surface 31 constituted by five or six separate reflective surfaces has been described, but the first reflective surface 31 may be constituted by four or less reflective surfaces or seven or more reflective surfaces. While the fan-shaped optical element 11 with a central angle (opening angle) θ of 90° has been described in the examples described above, the central angle θ may be 90° or less or 90° or more. The LED 6 used for the light source is not limited to a single LED 6, but a plurality of LEDs of multiple emission colors may be used for the light source. Further, in the illumination device 1, a plurality of optical devices 10 including a plurality of optical elements 11, or a plurality of projection units 5 may be arranged such that the Z-axes 12 are arranged in a row or such that the Z-axis 12 is shared.

One of the aspects disclosed above is an optical device that comprises: (a) a first reflective surface disposed to reflect, to a substantially arc-shaped first region around a first axis, at least a portion of first light incident along the first axis and having a light distribution characteristic with an optical axis parallel to the first axis, the first reflective surface comprising a plurality of reflective arc surfaces separated in a direction along the first axis; (b) a second reflective surface and a third reflective surface intersecting each other on the first axis and disposed such that the first reflective surface is located between the second reflective surface and the third reflective surface; and (c) a light-transmissive emission surface adapted to refract at least a portion of light reflected by the plurality of reflective arc surfaces to emit the light around the first axis, the emission surface having periodic irregularities in a cross section in the direction along the first axis.

The emission surface may have at least one of the periodic irregularities in each of regions that face respective ones of the plurality of reflective arc surfaces in the cross section in the direction along the first axis. The emission surface may have a plurality of recesses or protrusions in each of regions that face respective ones of the plurality of reflective arc surfaces in the cross section in the direction along the first axis.

Another aspect disclosed above is an optical device that comprises: (a) a first reflective surface disposed to reflect, to a substantially arc-shaped first region around a first axis, at least a portion of first light incident along the first axis and having a light distribution characteristic with an optical axis parallel to the first axis, the first reflective surface comprising a plurality of reflective arc surfaces separated in a direction along the first axis; (b) a second reflective surface and a third reflective surface intersecting each other on the first axis and disposed such that the first reflective surface is located between the second reflective surface and the third reflective surface; and (c) a light-transmissive emission surface adapted to refract light reflected by the plurality of reflective arc surfaces to emit the light around the first axis, the emission surface having a plurality of inflection points at a predetermined interval in a cross section in the direction along the first axis.

Each of the plurality of inflection points may be at least one of a changing point from a protrusion to a recess or from a recess to a protrusion, a changing point from a curved line to a straight line or from a straight line to a curved line, and a changing point of an inclination direction of a straight line. The emission surface may have at least two of the inflection points in each of regions respectively facing the plurality of reflective arc surfaces in the cross section in the direction along the first axis.

The plurality of reflective arc surfaces included in the optical device may comprise coaxial arc-shaped reflective surfaces centered on the first axis. The optical device may further comprise a control member adapted to inhibit direct incidence of a component of the first light on the optical axis into the first reflective surface. The emission surface may comprise a portion adapted to control a distribution around the first axis of light emitted through the emission surface. The optical device may further comprise a light-transmissive optical element substantially fan-shaped in a cross section perpendicular to the first axis.

The optical element may comprise a multilevel inner surface located inside the optical element, and the emission surface located at an outer region of the optical element. The multilevel inner surface may include the plurality of reflective arc surfaces, and a plurality of transmissive surfaces each corresponding to a respective one of the plurality of reflective arc surfaces. The optical element may comprise an assembly of a plurality of light-transmissive members each having an end surface perpendicular to the first axis. The assembly may comprise the plurality of light-transmissive members each having the end surface at least partially comprising a light-shielding surface. The assembly may comprise a light-shielding member at least partially disposed between the plurality of light-transmissive members.

The optical device may further comprise a light-shielding mask over a periphery of the emission surface.

Yet another aspect of the above is an illumination device that comprises the optical device according to the above and a light source adapted to emit the first light.

Yet another aspect disclosed above is a light-transmissive optical element that comprises a multilevel inner surface. The multilevel inner surface comprises a plurality of coaxial reflective curved surfaces disposed along a first axis and centered on the first axis, and a plurality of transmissive surfaces respectively corresponding to the plurality of reflective curved surfaces. The light-transmissive optical element further comprises an outer surface comprising a tubular or arc-shaped emission surface, and an assembly of a plurality of light-transmissive members each having an end surface perpendicular to the first axis. Each of the plurality of light-transmissive members has a portion of the inner surface of the optical element and a portion of the outer surface of the optical element.

The assembly may comprise the plurality of light-transmissive members each having the end surface at least partially comprising a light-shielding surface. The assembly may comprise a light-shielding member at least partially disposed between the plurality of light-transmissive members. The light-shielding member may comprise a portion extending out from the outer surface. Each of the plurality of light-transmissive members may have at least one set of a corresponding one of the plurality of reflective curved surfaces and a corresponding one of the plurality of transmissive surfaces. Each of the plurality of light-transmissive members may have a corresponding one of the plurality of reflective curved surfaces and a corresponding one of the plurality of transmissive surfaces. Each of the plurality of reflective curved surfaces may be configured to reflect, around the first axis, a portion of first light incident from a first side of the first axis along the first axis and having a light distribution characteristic with an optical axis parallel to the first axis.

Yet another aspect of the above is an illumination device that comprise: the optical element according to the above; and a light source adapted to emit the first light. The illumination device may further comprise a second reflective surface and a third reflective surface, wherein the plurality of reflective curved surfaces constitutes the first reflective surface, the second reflective surface and the third reflective surface intersect each other on the first axis on both sides of the first reflective surface, and the optical element has the arc-shaped emission surface.

It is to be understood that although certain embodiments of the present invention have been described, various other embodiments and variants may occur to those skilled in the art that are within the scope and spirit of the invention, and such other embodiments and variants are intended to be covered by the following claims.

The invention claimed is:

1. An optical device comprising:
a first reflective surface disposed to reflect, to a substantially arc-shaped first region around a first axis, at least a portion of first light incident along the first axis and having a light distribution characteristic with an optical axis parallel to the first axis,
the first reflective surface comprising a plurality of reflective arc surfaces separated in a direction along the first axis;
a second reflective surface and a third reflective surface intersecting each other on the first axis and disposed such that the first reflective surface is located between the second reflective surface and the third reflective surface; and
a light-transmissive emission surface adapted to refract at least a portion of light reflected by the plurality of reflective arc surfaces to emit the light around the first axis,
the emission surface having periodic irregularities in a cross section in the direction along the first axis.

2. The optical device according to claim 1, wherein the emission surface has at least one of the periodic irregularities in each of regions that face respective ones of the plurality of reflective arc surfaces in the cross section in the direction along the first axis.

3. The optical device according to claim 1, wherein the emission surface has a plurality of recesses or protrusions in each of regions that face respective ones of the plurality of reflective arc surfaces in the cross section in the direction along the first axis.

4. The optical device according to claim 1, wherein the plurality of reflective arc surfaces comprise coaxial arc-shaped reflective surfaces centered on the first axis.

5. The optical device according to claim 1, further comprising a control member adapted to inhibit direct incidence of a component of the first light on the optical axis onto the first reflective surface.

6. The optical device according to claim 1, wherein the emission surface comprises a portion adapted to control a distribution around the first axis of light emitted through the emission surface.

7. The optical device according to claim 1, comprising a light-transmissive optical element substantially fan-shaped in a cross section perpendicular to the first axis, the optical element comprising:
a multilevel inner surface located inside the optical element, the multilevel inner surface comprising:
the plurality of reflective arc surfaces; and
a plurality of transmissive surfaces each corresponding to a respective one of the plurality of reflective arc surfaces, and
the emission surface located at an outer region of the optical element.

8. The optical device according to claim 7, wherein the optical element comprises an assembly of a plurality of light-transmissive members each having an end surface perpendicular to the first axis.

9. The optical device according to claim 8, wherein the assembly comprises the plurality of light-transmissive members each having the end surface at least partially comprising a light-shielding surface.

10. The optical device according to claim 8, wherein the assembly comprises a light-shielding member at least partially disposed between the plurality of light-transmissive members.

11. An optical device comprising:
a first reflective surface disposed to reflect, to a substantially arc-shaped first region around a first axis, at least a portion of first light incident along the first axis and having a light distribution characteristic with an optical axis parallel to the first axis, the first reflective surface comprising a plurality of reflective arc surfaces separated in a direction along the first axis;
a second reflective surface and a third reflective surface intersecting each other on the first axis and disposed such that the first reflective surface is located between the second reflective surface and the third reflective surface; and
a light-transmissive emission surface adapted to refract light reflected by the plurality of reflective arc surfaces to emit the light around the first axis,
the emission surface having a plurality of inflection points at a predetermined interval in a cross section in the direction along the first axis.

12. The optical device according to claim 11, wherein each of the plurality of inflection points is at least one of a changing point from a protrusion to a recess or from a recess to a protrusion, a changing point from a curved line to a straight line or from a straight line to a curved line, and a changing point of an inclination direction of a straight line.

13. The optical device according to claim 11, wherein the emission surface has at least two of the inflection points in each of regions respectively facing the plurality of reflective arc surfaces in the cross section in the direction along the first axis.

14. The optical device according to claim 11 further comprising a light-shielding mask over a periphery of the emission surface.

15. The optical device according to claim 11, wherein the plurality of reflective arc surfaces comprise coaxial arc-shaped reflective surfaces centered on the first axis.

16. The optical device according to claim 11 further comprising a control member adapted to inhibit direct incidence of a component of the first light on the optical axis onto the first reflective surface.

17. The optical device according to claim 11 wherein the emission surface comprises a portion adapted to control a distribution around the first axis of light emitted through the emission surface.

18. The optical device according to claim 11, comprising a light-transmissive optical element substantially fan-shaped in a cross section perpendicular to the first axis, the optical element comprising:
a multilevel inner surface located inside the optical element, the multilevel inner surface comprising:
the plurality of reflective arc surfaces; and
a plurality of transmissive surfaces each corresponding to a respective one of the plurality of reflective arc surfaces, and
the emission surface located at an outer region of the optical element.

19. An illumination device comprising:
the optical device according to claim 1 and
a light source adapted to emit the first light.

20. An illumination device comprising:
the optical device according to claim 11 and
a light source adapted to emit the first light.

21. A light-transmissive optical element comprising:
a multilevel inner surface comprising:
a plurality of coaxial reflective curved surfaces disposed along a first axis and centered on the first axis, and a plurality of transmissive surfaces respectively corresponding to the plurality of reflective curved surfaces; and
an outer surface comprising a tubular or arc-shaped emission surface,
the optical element comprising an assembly of a plurality of light-transmissive members each having an end surface perpendicular to the first axis,
wherein each of the plurality of light-transmissive members has a portion of the inner surface of the optical element and a portion of the outer surface of the optical element.

* * * * *